United States Patent
Zhang

(10) Patent No.: US 10,483,595 B2
(45) Date of Patent: Nov. 19, 2019

(54) TUNGSTEN-BASED MATERIAL SUPER BATTERY AND SUPERCAPACITOR

(71) Applicant: SUZHOU HANS ENERGY STORAGE TECHNOLOGY CO., LTD., Suzhou, Jiangsu (CN)

(72) Inventor: Yuhong Zhang, Suzhou (CN)

(73) Assignee: SUZHOU HANS ENERGY STORAGE TECHNOLOGY CO., LTD., Suzhou, Jiangsu (CN)

( * ) Notice: Subject to any disclaimer, the term of this patent is extended or adjusted under 35 U.S.C. 154(b) by 462 days.

(21) Appl. No.: 15/030,016

(22) PCT Filed: May 19, 2014

(86) PCT No.: PCT/CN2014/000502
§ 371 (c)(1),
(2) Date: Jul. 25, 2016

(87) PCT Pub. No.: WO2015/054974
PCT Pub. Date: Apr. 23, 2015

(65) Prior Publication Data
US 2016/0336622 A1    Nov. 17, 2016

(30) Foreign Application Priority Data

Oct. 16, 2013  (CN) .......................... 2013 1 0484879

(51) Int. Cl.
| | |
|---|---|
| H01M 10/20 | (2006.01) |
| H01M 10/36 | (2010.01) |
| H01M 4/48 | (2010.01) |
| H01M 4/56 | (2006.01) |
| H01M 4/583 | (2010.01) |
| H01G 11/46 | (2013.01) |

(52) U.S. Cl.
CPC ............ *H01M 10/20* (2013.01); *H01G 11/46* (2013.01); *H01M 4/48* (2013.01); *H01M 4/56* (2013.01); *H01M 4/583* (2013.01); *H01M 10/36* (2013.01); *H01M 2220/20* (2013.01)

(58) Field of Classification Search
CPC .......... H01M 4/48; H01M 4/56; H01M 4/583; H01M 10/20; H01M 10/36; H01M 11/46; H01M 2220/20; H01G 11/46
See application file for complete search history.

(56) References Cited

U.S. PATENT DOCUMENTS

| | | | | |
|---|---|---|---|---|
| 5,728,181 | A * | 3/1998 | Jung ..................... | H01G 9/042 29/623.1 |
| 5,855,862 | A * | 1/1999 | Grenier ................ | B01J 37/0018 423/594.13 |
| 5,985,479 | A * | 11/1999 | Boolish ................... | H01M 2/34 429/56 |
| 6,150,053 | A * | 11/2000 | Murata ................... | H01M 4/13 429/188 |
| 6,383,684 | B1 * | 5/2002 | Yoshimura ............. | C01G 41/00 429/218.1 |
| 2005/0025700 | A1* | 2/2005 | Bulian ................... | B82Y 30/00 423/606 |
| 2008/0067078 | A1* | 3/2008 | Kitaori ................. | A61L 2/0088 205/746 |
| 2008/0131773 | A1* | 6/2008 | Lucas ....................... | G02F 1/15 429/204 |
| 2010/0113254 | A1 | 5/2010 | Sato et al. | |

FOREIGN PATENT DOCUMENTS

| | | |
|---|---|---|
| CN | 101128772 A | 2/2008 |
| CN | 101641292 A | 2/2010 |
| JP | H11238511 A | 8/1999 |
| WO | WO-2001020695 A1 | 3/2001 |
| WO | WO-0120695 A9 | 10/2002 |
| WO | WO-2014142066 A1 | 9/2014 |

OTHER PUBLICATIONS

Szymasnki, J.T.—The Crystal Structure of Tungstite, WO3 H2O, Canadian Mineralogist, vol. 22, pp. 681-688, 1984 (Year: 1984).*

(Continued)

*Primary Examiner* — Anca Eoff
(74) *Attorney, Agent, or Firm* — Harness, Dickey & Pierce, P.L.C.

(57) ABSTRACT

The invention concerns a high-performance tungsten-based super battery system, which relates to an integrated design and a construction method of a corresponding material, a structure and a process. In the technology, a tungsten-based material is used a negative electrode, and a high-specific-surface-area carbon or lead oxide is used as a positive electrode to assemble four types of super batteries comprising: 1) a tungsten-carbon super battery, 2) a tungsten-tungsten super battery, 3) a tungsten-lead oxide super battery, and 4) a super battery system of a hybridized tungsten super battery (comprising lead oxide, lead, and a carbon material) on which the foregoing two types of super batteries are hybridized in use. The introduction of the tungsten-based material endows a novel class of super batteries with higher power density, higher energy density, longer cycling life, high durability and reliable safety. This will enable a broad range of applications.

3 Claims, 26 Drawing Sheets

(56) References Cited

OTHER PUBLICATIONS

Huang, K., Zhang, Q.—Rechargeable lithium battery based on a single hexagonal tungsten trioxide nanowire, Nano Energy, 2011 (Year: 2011).*
Machine translation of JP 11-238511, published on Aug. 31, 1999 (Year: 1999).*
Machine translation of JPWO 2014142066, published on Feb. 16, 2017 (Year: 2017).*
International Preliminary Report on Patentability regarding International Application No. PCT/CN2014/000502, dated Aug. 11, 2015. Translation provided by Han Hong Law Firm.
International Search Report (English and Chinese) for PCT/CN2014/000502, dated Aug. 1, 2014; ISR/CN.
Gao, Lina et al., "High-Performance Energy-Storage Devices Based on $WO_3$ Nanowire Arrays/Carbon Cloth integrated Electrodes," Journal of Materials Chemistry A; RSC Publishing; Apr. 9, 2013; pp. 7167-7173.

* cited by examiner

TUNGSTEN-BASED MATERIAL SUPER BATTERY AND SUPERCAPACITOR

CROSS REFERENCE TO RELATED APPLICATIONS

This application is a U.S. National Phase Application under 35 U.S.C. 371 of International Application No. PCT/CN2014/000502 filed on May 19, 2014 and published in Chinese as WO 2015/054974 on Apr. 23, 2015. This application is based on and claims the benefit of priority from Chinese Patent Application No. 201310484879.7 filed Oct. 16, 2013. The entire disclosures of all of the above applications are incorporated herein by reference.

FIELD OF INVENTION

Embodiments of the present invention relates to a class of tungsten trioxide material for electrochemical energy storage and conversion devices, including the design and synthesis of electrode materials, design and manufacturing of the electrode and the cell structure, as well as design and manufacturing of other related components. More particularly, the invention relates to chemistry, chemical engineering, energy material sectors.

BACKGROUND

The present patent application relates to design and manufacturing of a class of high-performance battery and supercapacitor (referred as a super battery in the whole context of patent). With the rapid development of industrialization and the global economy, worldwide energy consumption has increased steadily, which inevitably leads to the increasing depletion of fossil fuels and deterioration of the environment.

Exploring renewable energy sources (such as solar, wind and tidal energy), and also improving efficiency of energy use, for example, the use of electric or hybrid electric vehicles to replace the traditional internal combustion engine vehicles, have become the main strategy to solve the energy crisis.

Therefore, to develop easy, stable electrochemical energy storage devices with fast power delivery capability becomes increasingly urgent. Facing this challenge, sustainable, low pollution electrochemical energy storage devices will be the core technology for supporting modern civilization.

Batteries and supercapacitors are commonly used electrochemical devices for portable electronics, electric vehicles, renewable energy storage, and other applications. Commonly referred electrochemical energy devices mainly include lead-acid batteries, nickel-cadmium (Ni—Cd) batteries, nickel-metal hydride (NiMH) batteries, lithium-ion batteries and supercapacitors. Due to their low cost and reliable safety property, lead-acid batteries have been widely used for more than 150 years. However, lead-acid batteries have short cycling life and low power density. By comparison, Ni—Cd batteries have slightly improved power density and cycling life but with increased cost and toxicity. Comparing with the previous two types of batteries, NiMH batteries have significantly higher energy density, but their cycling life is still short and cost has been increased dramatically in the recent years due to the increased price of rare earth metals. Because of their high energy density, low self-discharge and long cycling life, lithium-ion batteries are so far the most widely used rechargeable batteries. However, the costs for lithium-ion batteries are high due to the need of scarce lithium and strictly controlled manufacturing process. And more importantly, since organic electrolyte is used in the lithium-ion battery, the safety property is poor, which is unfavorable for large-scale application such as EVs and grid-storage.

Compared with battery, supercapacitors can provide higher power density and longer cycling life, but their energy densities are too low to be used in large-scale storage. Although using organic electrolyte can provide improved energy density of supercapacitors, the cost is largely increased and the use of electrolyte also poses similar safety concern to lithium ion batteries.

There is therefore a great demand in developing safe and low cost electrochemical energy storage devices with significantly improved power density, energy density, and cycling life. Besides the too high cost, in the aspect of safety, currently used energy storage systems are problematic due to the use of highly flammable organic electrolytes, which cannot meet the safety requirement for applications. Aqueous-electrolyte-based energy storage devices, such as lead-acid batteries, Ni—Cd, and NiMH batteries, are non-flammable and safe in case of accident and other mis-operation situations. Therefore, improving the performance of aqueous-electrolyte-based energy storage devices can lead to highly safe, low-cost devices for transportation, stationary energy storage, and other broad spectrum of applications.

Among the aqueous-electrolyte-based systems, lead-acid batteries that are highly reliable and low cost are of particular commercial interest. To date, extensive efforts have been made to improve the performance of lead-acid batteries, such as making better electrodes with controlled composition and structure, using gel-like electrolyte and fibrous separation membranes. Despite such extensive efforts result in increased performance to some extent, overall it is thus far still difficult to fabricate lead-acid batteries with high enough power density and lifetime as required by many industrial applications.

In the recent years, lead-acid super-batteries were developed with significantly improved power performance and lifetime. This was mainly achieved by completely or partially replacing the traditional anode materials (Pb) and/or cathode materials ($PbO_2$) with porous carbons. The prior arts in such super-batteries were described in a series of patents (KR1020060084441A, CA2680743, CA2680747, CN200910183503). Despite the improved power density and lifetime achieved, in comparison with the energy density of lead-acid batteries (40-50 Wh/kg), the cost is that the energy densities of such super-batteries are dramatically reduced (8-16 Wh/kg). The incorporation of carbon materials into electrodes inevitably leads to mismatched electrode potentials and low capacity.

Compared with the carbon material, metal oxide material can provide higher capacity. Therefore, an appropriate use of metal oxide can provide lead-acid super batteries with higher energy density. More studied oxides include manganese oxide, ruthenium oxide, iron oxide, et al nickel oxide, but there very limited oxides that are suitable for acidic electrolytes. Although ruthenium oxide can work in an acidic electrolyte, but its cost is extremely high and not suitable for large-scale industrial applications. Moreover, since its working voltage is above zero volts (compared to silver/silver chloride electrode), it is not suitable to construct lead-acid super batteries. Tungsten oxide material has excellent electrochemical stability in acidic solution, but so far there is very little research on its energy storage properties. Lee et al. (Chem Commun., 2011, 47, 1021-1023) reported the electrochemical properties of high-temperature-sintered tungsten oxide based on porous silica as hard template. Its working potential ranges from −0.2 to 0.8 V, but its capacity is low. Wang et al. (Adv. Energy Mater., 2012, 2, 1328-1332) reported tungsten oxide material grown at 1080° C. as a supercapacitor structure material, which has stable electrochemical properties in neutral sodium sulfate electrolytic solution. Lu et al (Carbon, 2014, 69, 287-293) reported the electrochemical properties of a simple tungsten oxide/carbon aerogel composite based on the lower temperature synthesis with single electrode, the operating voltage window also quite narrow (−0.3 to 0.5 volts), and therefore the capacitance is low. While these works reported the possibility of using tungsten oxide material as an energy storage material in acidic electrolytes, they did not establish an efficient full battery system. In addition, combining oxide material and lead material to construct an energy storage device has failed to report or proposed now.

Insofar as we are aware, no lead-acid storage devices formerly developed can provide high enough power and high energy density, as well as long enough lifetime, that are required by many industrial applications.

Disclosure

With the rapid development of modern industrialization and human civilization, human's demand in high efficiency, safe and low-cost energy storage technology continues to grow. Because lead-acid batteries have unique advantages, they are still based on the modern industry and have a great prospect in many applications.

However, improvements towards lead-acid battery materials, structure and technology are still unable to break through the bottleneck that limits its performance to improve, making it impossible to meet the needs in the field of large-scale energy storage and power supply.

Accordingly, the present technological invention focuses on the material itself to design and build a class of novel low-cost, high-performance super batteries based on lead-acid battery system. Their structures will be further described below. One aspect of the present invention is to provide a tungsten trioxide material for electrochemical energy storage and conversion devices, which is selected from one or more than one types of various tungsten trioxide crystal structures:

(a) the aforementioned various crystal structures of tungsten trioxide ($WO_3$), comprising the monoclinic structure, triclinic structure, orthorhombic structure, cubic crystal structure, hexagonal structure, bi-continuous structure tungsten trioxide, and combinations of two or more from the various $WO_3$ crystal structures;

(b) hydrous tungsten trioxides ($WO_3$ $nH_2O$) having said crystal structures of claim (a), where n values can range from 0 to 5, preferentially in the range of 0 to 2, more preferably in the range of 0-1;

(c) doped tungsten trioxides or hydrous tungsten trioxide with another element A ($A_xWO_3$ or $A_xWO_3$ $nH_2O$) having said tungsten trioxide ($WO_3$) of claim (a), or said hydrous tungsten trioxide ($WO_3$ $nH_2O$) of claim (b), wherein the doping element A may be selected from one or more of the following groups of elements: alkali metals, alkaline earth metals, transition metals, rare metals, of which x values may be in the range from 0 to 0.3, preferentially in the range of 0 to 0.1, more preferably in the range of 0 to 0.05, an alkali metal may be sodium, potassium, an alkaline earth metal may be calcium, strontium, transition metal may be titanium, zirconium, rare metal may be lanthanum, cerium;

(d) a mixture from one or more of the said tungsten trioxide ($WO_3$) having various crystal structures of claim (a), said hydrous tungsten trioxides ($WO_3$ $nH_2O$) having various crystal structures of claim (b), and said element doped tungsten trioxides ($A_xWO_3$) or hydrous tungsten trioxide ($A_xWO_3$ $nH_2O$) having various crystal structures of claim (c);

(e) a mixture or composite material consisting of one or more of the aforementioned tungsten materials of claim (a), (b), (c), (d), wherein tungsten material is tungsten trioxide ($WO_3$), hydrous trioxide ($WO_3$ $nH_2O$), element-doped tungsten trioxide ($A_xWO_3$) or elements doped hydrous tungsten trioxide ($A_xWO_3$ $nH_2O$), and additional tungsten-free material, wherein said tungsten-free material may be selected from the following materials: carbon materials, polymer materials, metal oxides or its salts, or ceramic materials, and the said carbon materials include, but are not limited to carbon black, onion structured carbon particles, activated carbon, mesoporous carbon, carbon nanotubes, carbon nanofiber, graphite, graphene, graphene oxide or various combinations thereof, the polymer materials include, but are not limited to, polyaniline, polypyrrole, polythiophene, poly (3,4-ethylenedioxythiophene), polystyrene, sulfonated polystyrene, or various combinations thereof, and the metals and their salts include, but are not limited to titanium, vanadium, chromium, zirconium, niobium, molybdenum, lead, bismuth or various combinations thereof, wherein the ceramic materials include, but are not limited to, zirconium oxide, silicon oxide, strontium oxide, aluminum oxide, or various combinations thereof;

(f) a mixture or composite material consisting of one or more of the aforementioned tungsten materials of claim (a), (b), (a), (d), wherein tungsten material is tungsten trioxide ($WO_3$), hydrous trioxide ($WO_3$ $nH_2O$), element-doped tungsten trioxide ($A_xWO_3$) or elements doped hydrous tungsten trioxide ($A_xWO_3$ $nH_2O$), and said mixture of composite of claim (e).

The wherein said tungsten trioxide material is a powdered material, the material particle size is around 50 μm or less, better choice of particle size is less than 20 μm, the optimal choice of particle size is less than 5 μm.

The wherein said electrochemical energy storage and conversion device is selected from the following: tungsten-carbon super battery, tungsten-tungsten super battery, tungsten-lead oxide super battery, tungsten/carbon-lead oxide hybrid super battery system.

The wherein said super batteries utilize an aqueous electrolyte solution, the preferred electrolyte is acidic aqueous system, better choice for the aqueous system electrolyte contains sulfuric acid.

The current collectors used the wherein said tungsten-carbon super battery, tungsten-tungsten super battery, tungsten-lead oxide super battery, tungsten/carbon-lead oxide hybrid super battery system may be a metal material, including but not limited to lead, chromium, titanium, tungsten, molybdenum, silver, ruthenium, palladium, platinum, iridium, gold and their alloys; a carbon material, a conductive polymer material or combination of said material, and the lead alloy grid used in commercial lead-acid batteries can also be used directly as an electrode current collector.

The lead oxide used in the wherein said tungsten-lead oxide super battery, tungsten/carbon-lead oxide hybrid super battery system can be the same as that used in commercial lead-acid batteries.

In conjunction with the following drawings, tungsten trioxide material and its applications of the present application will be further explained.

FIGURES DESCRIPTION

FIG. 1 shows schematic of each single cell of the tungsten-carbon super battery, comprising: a tungsten-containing anode, a separator, a carbon or tungsten cathode and the electrolyte filled in between.

FIG. 2A-D is a structure diagram of tungsten-carbon super-cell based on hybrid design of the negative electrode. This battery structure consists of a hybridized tungsten-containing anode, a separator, a carbon or tungsten cathode and the electrolyte filled in between. (In structure A, tungsten-containing and lead-containing active material are coated on different areas of the electrodes; in structure B, tungsten-containing and lead-containing materials are formed to a mixture and then coated evenly coated on the current collector; in structure C, an active layer of tungsten-containing material and an active layer of lead-containing material is alternately coated on the electrode; in structure D, the tungsten-containing electrode and the lead-containing electrode are prepared separately and then connected in parallel to form the anode. The structure of tungsten-tungsten super battery is similar to the tungsten-carbon super battery, so it is not repeatedly described here.

FIG. 3 is a structure diagram of tungsten-lead super battery. This battery structure contains a tungsten-containing anode, a separator, a lead oxide cathode and the electrolyte filled in between.

FIG. 4A-D is a structure diagram of tungsten-lead super-cell based on hybrid design of the negative electrode. This battery structure consists of a hybridized tungsten-containing anode, a separator, a lead oxide cathode and the electrolyte filled in between. (In structure A, tungsten-containing and lead-containing active material are coated on different areas of the electrodes; in structure B, tungsten-containing and lead-containing materials are formed to a mixture and then coated evenly coated on the current collector; in structure C, an active layer of tungsten-containing material and an active layer of lead-containing material are alternately coated on the electrode; in structure D, the tungsten-containing electrode and the lead-containing electrode are prepared separately and then connected in parallel to form the anode.

FIG. 5 is a structure diagram of a combined-type super battery system. This system consists of a set of batteries shown in FIG. 1 or 2, and the other group of batteries shown in FIG. 3 or 4 or others batteries such as nickel-metal hydride batteries, nickel cadmium batteries, lithium-ion batteries, zinc-air batteries, lithium-sulfur batteries. The two groups of batteries are connected in parallel.

DRAWING REFERENCE

Wherein drawing reference of FIG. 1 is listed below:
1. The high surface area carbon cathode (or tungsten-containing cathode)
2. The cathode current collector
3. The anode current collector
4. Tungsten material-based negative
5. The porous separator
6. The structure of tungsten carbon-based super battery Wherein, FIG. 2A-D drawing reference is listed as follows:
7. The high surface area carbon anode
8. The cathode current collector
9. The anode current collector
10. The tungsten-based active material
11. The lead-based active material
12. The separator
13. The structure of tungsten-carbon-based hybrid super battery Note: In FIG. 2A, the tungsten-containing and lead active materials are coated on different areas of the electrodes; in FIG. 2B, the tungsten-based and lead-based materials are first premixed and then evenly coated on the current collector; in the drawings 2C, the active layer of tungsten-containing material and lead-containing material are alternately coated on the electrodes; in FIG. 2D, the tungsten-containing electrode and the lead-containing electrode are prepared separately and then connected in parallel to form the anode.

Wherein, drawing reference of FIG. 3 is listed below:
14. Lead oxide electrode
15. The cathode current collector
16. The anode current collector
17. Tungsten electrode
18. The separator
19. Tungsten-lead-based hybrid super-battery structure Wherein, drawing reference of FIG. 4A-D is listed below:
20. Lead oxide electrodes
21. The cathode current collector
22. The anode current collector
23. Tungsten electrode
24. The lead-based electrodes
25. The separator
26. Tungsten-lead-based hybrid super-battery structure Note: In FIG. 4A, the tungsten-containing and lead active materials are coated on different areas of the electrodes; in FIG. 4B, the tungsten-based and lead-based materials are first premixed and then evenly coated on the current collector; in FIG. 4C, the active layer of tungsten-containing material and lead-containing material are alternately coated on the electrodes; in FIG. 4D, the tungsten-containing electrode and the lead-containing electrode are prepared separately and then connected in parallel to form the anode.

Wherein, drawing reference of FIG. 5 is listed below:
27. The lead oxide electrode
28. The current collector lead oxide electrode
29. The current collector of carbon electrode
30. The carbon electrode
31. The separator
32. Electrodes based on lead, tungsten-based materials or their mixtures
33. The current collector of tungsten-based electrode
34. Lead electrode
35. Series connection of tungsten-carbon super batteries
36. Series connection of lead-acid or tungsten-lead super batteries
37. A group tungsten-carbon super batteries in series connection
38. Electrodes based on the electrode lead, tungsten-based materials or their mixtures
39. A group of lead-acid or tungsten-lead super batteries in series connection
40. Tungsten-lead-carbon-based hybrid super battery structure FIG. 6 is a scanning electron microscopic (SEM) image of the hydrated tungsten oxide material obtained in the Example 1 (A);

Figure 11A:
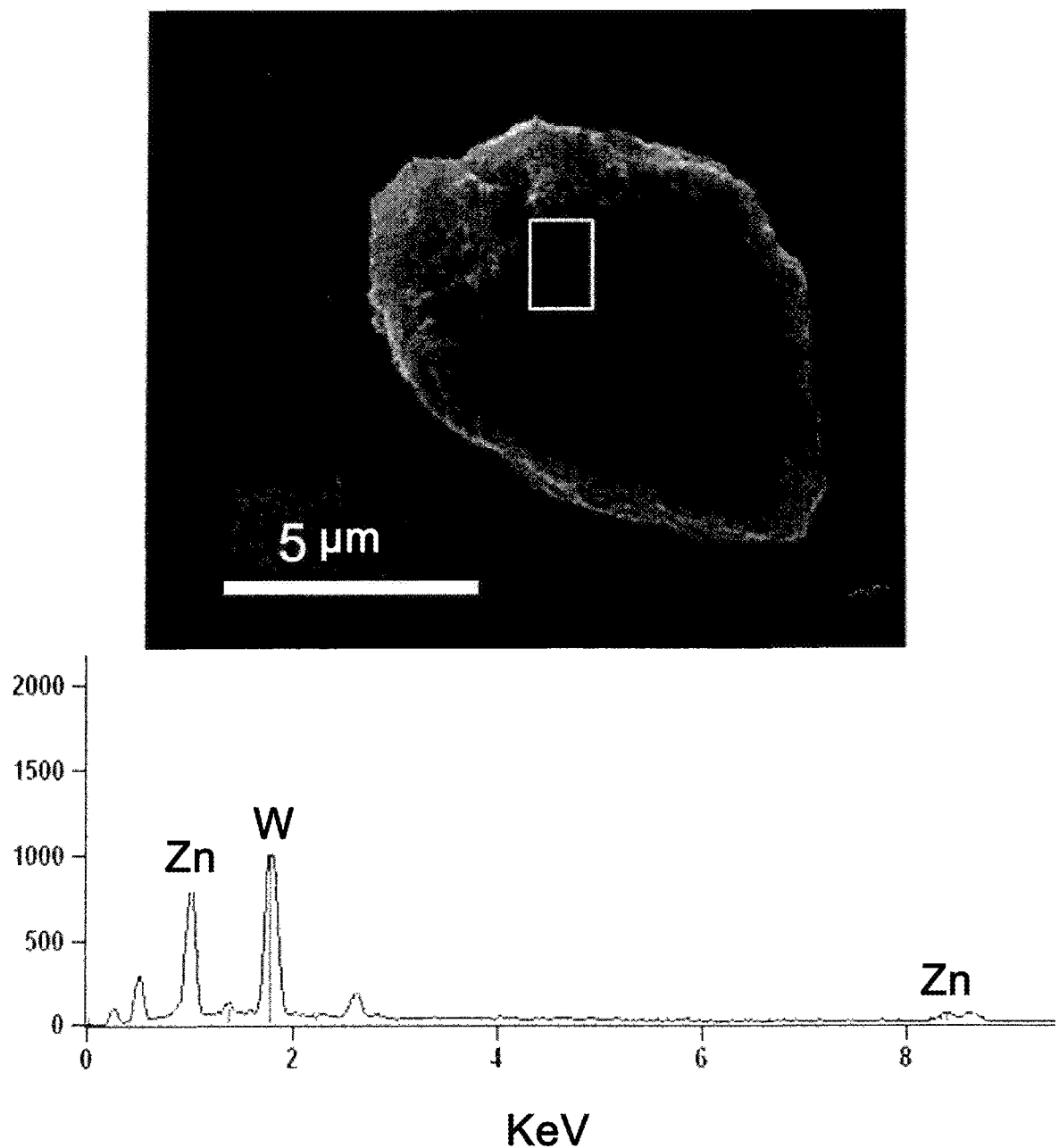
Figure 11B:
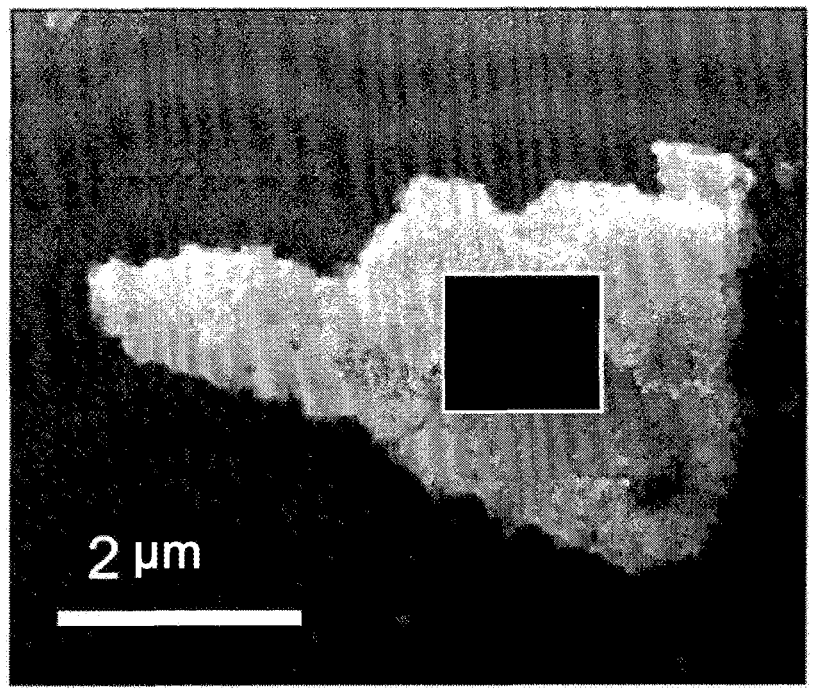
Figure 11B:
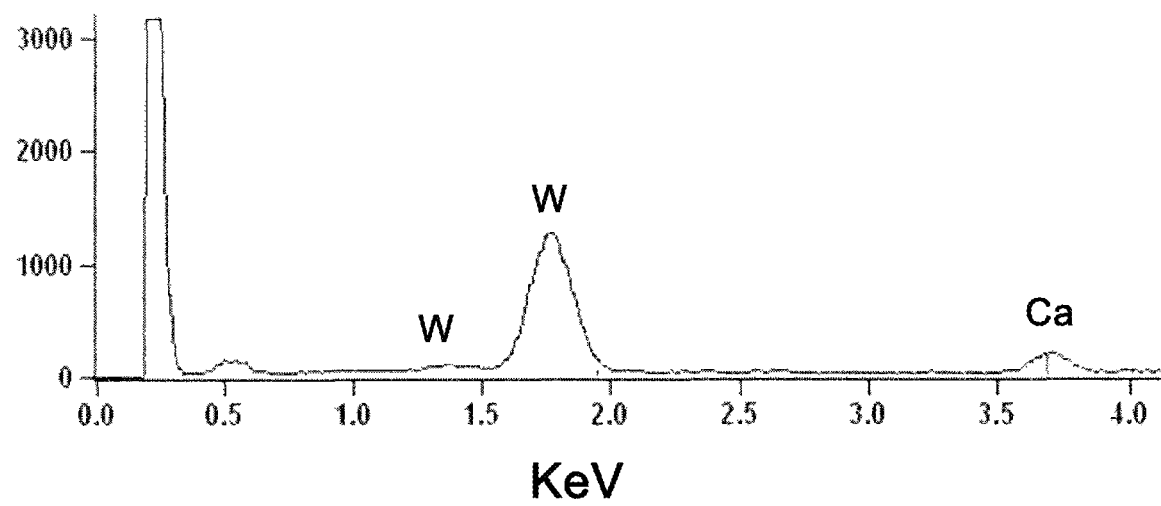
Figure 11C:
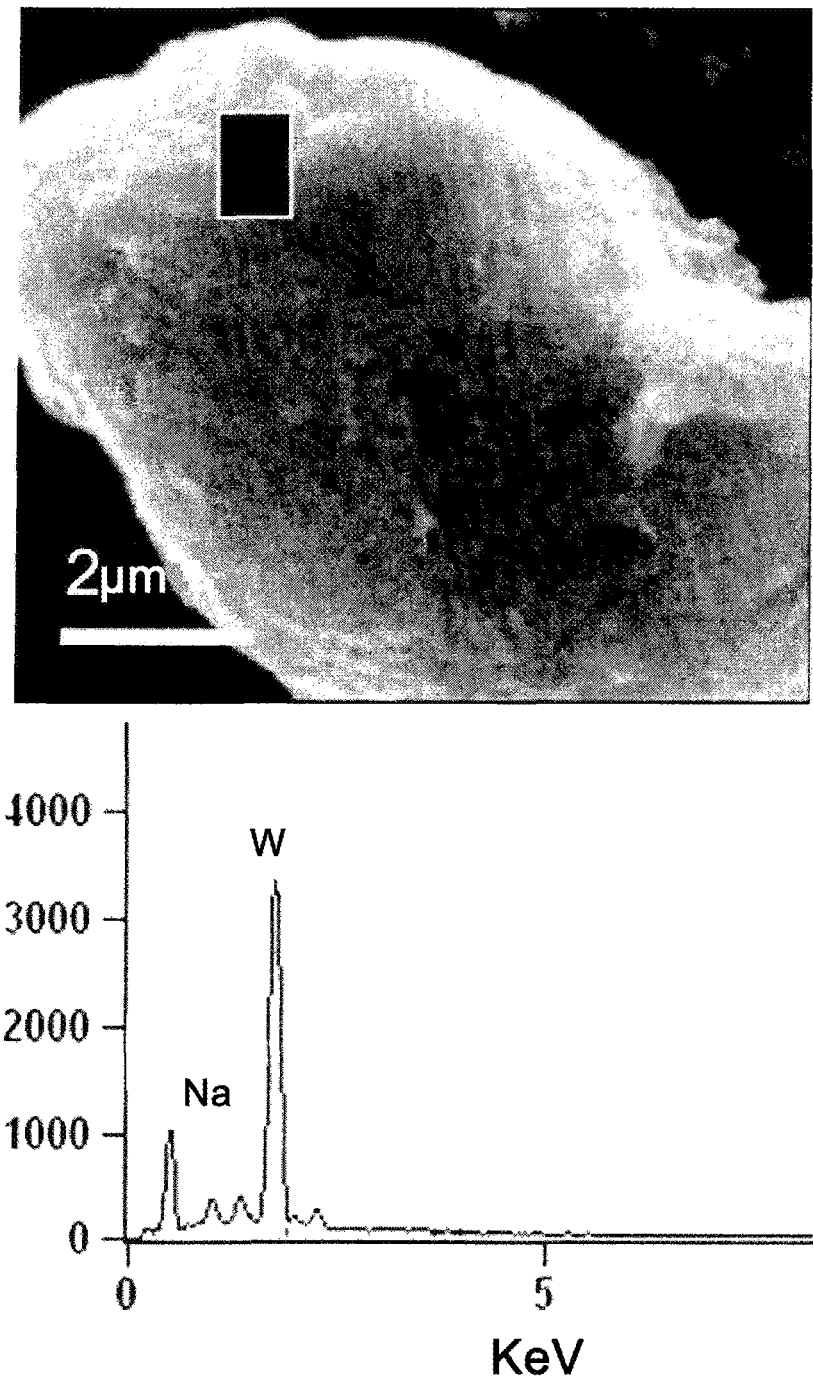
Figure 12A:
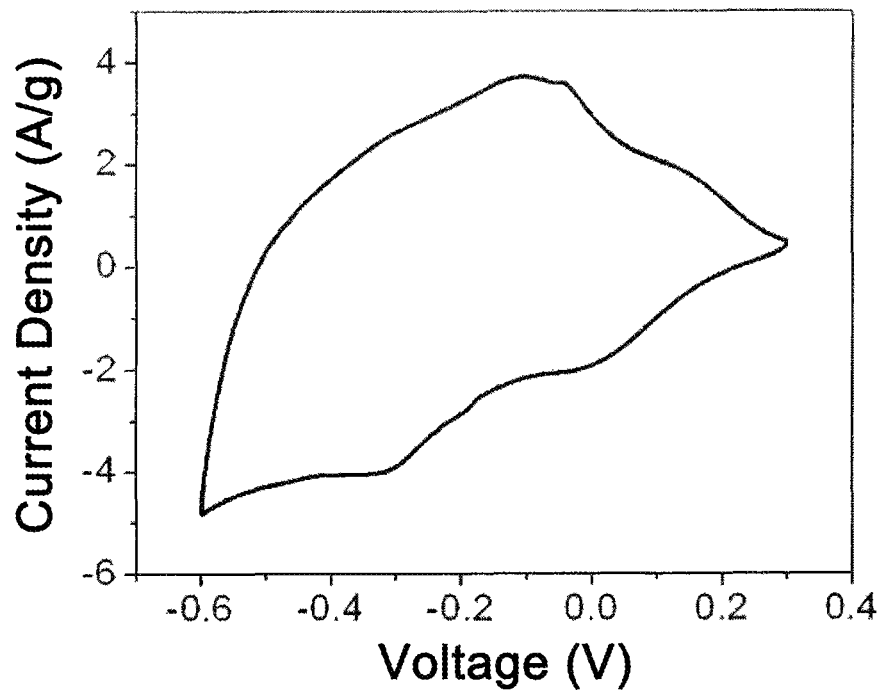
Figure 13:
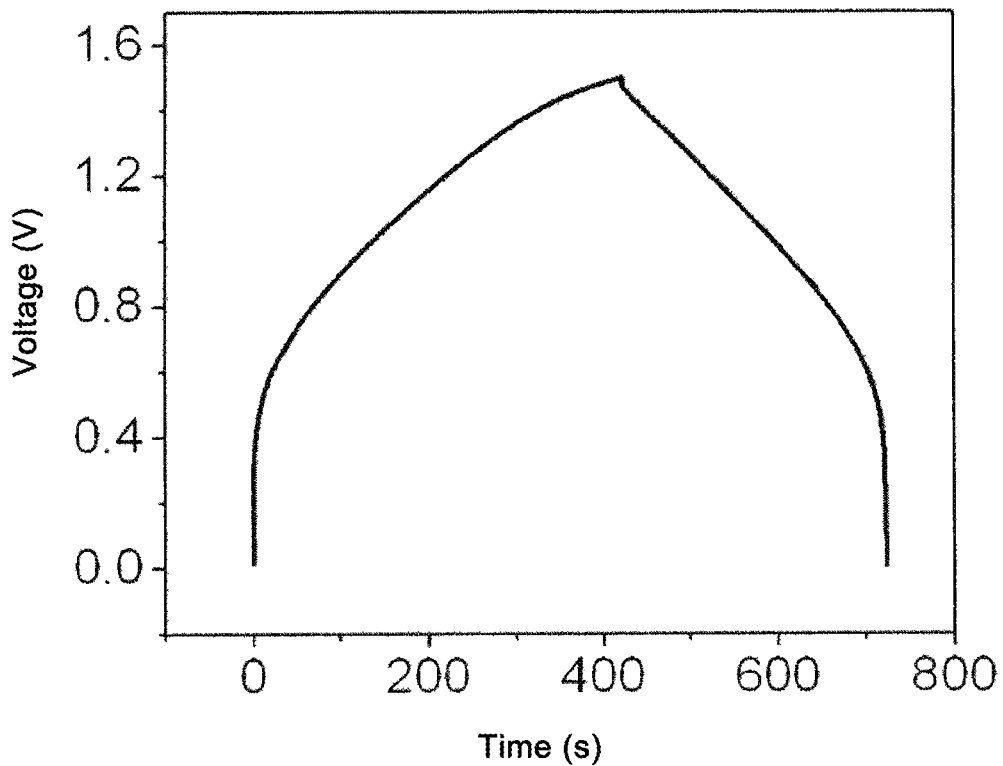
Figure 14:
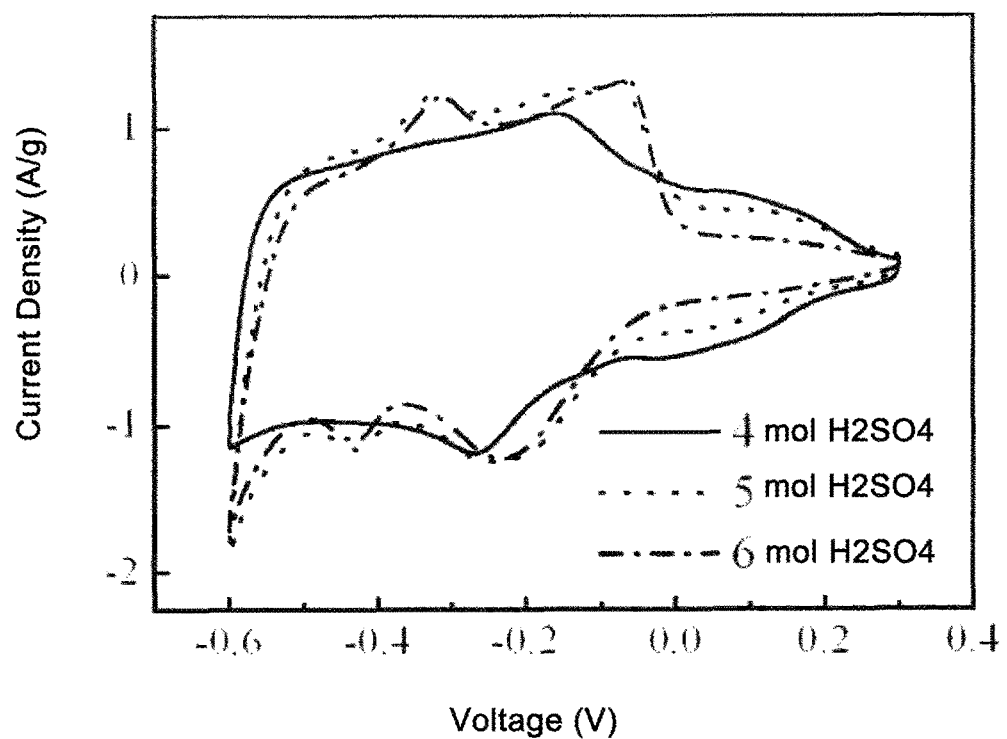
Figure 15:
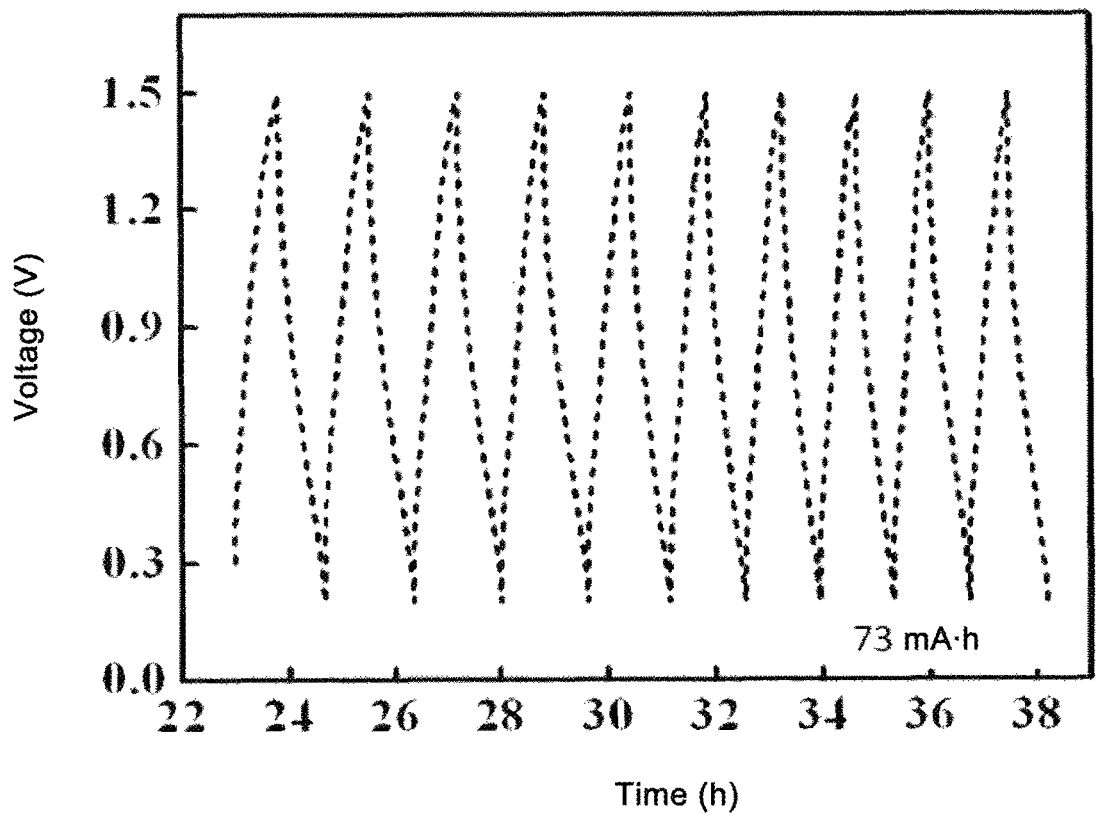
Figure 16:
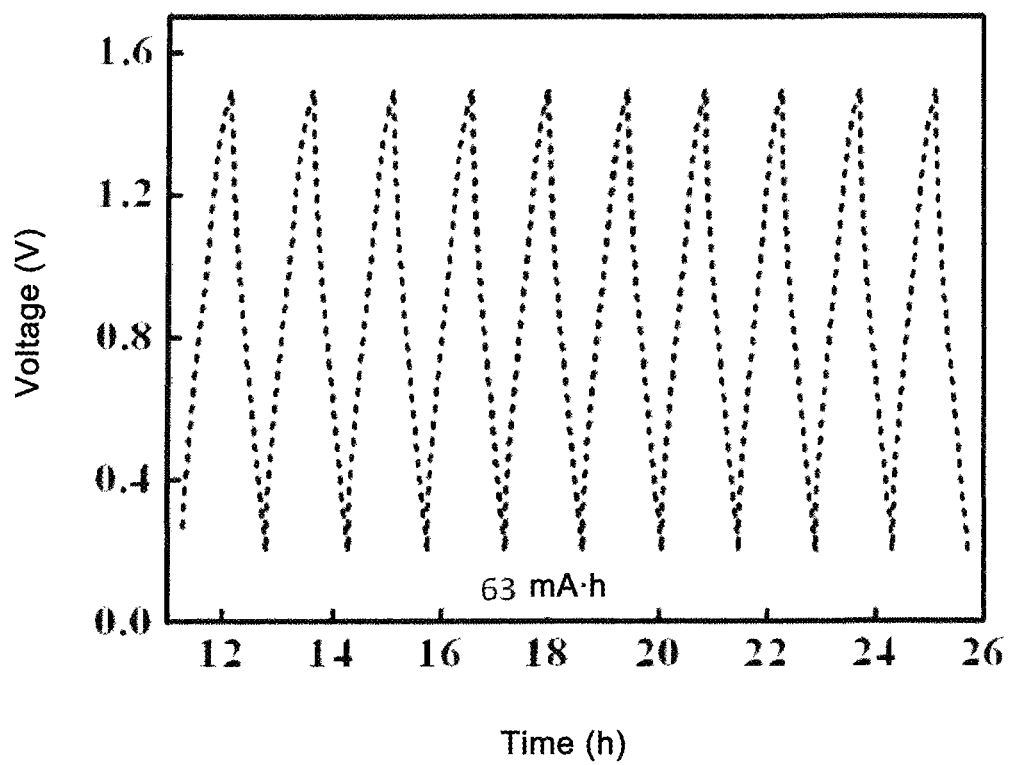
Figure 17:
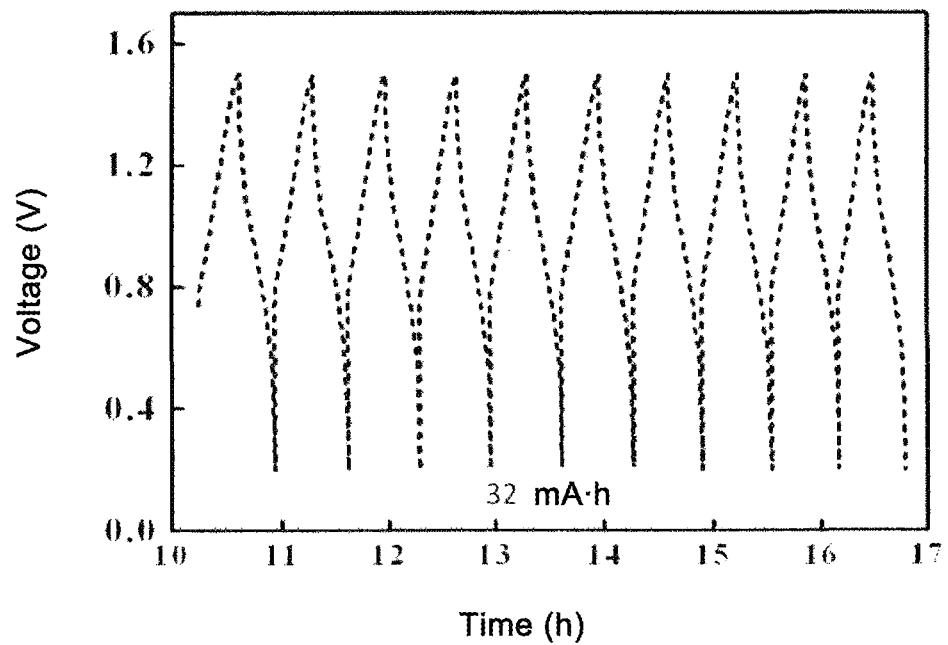
Figure 18:
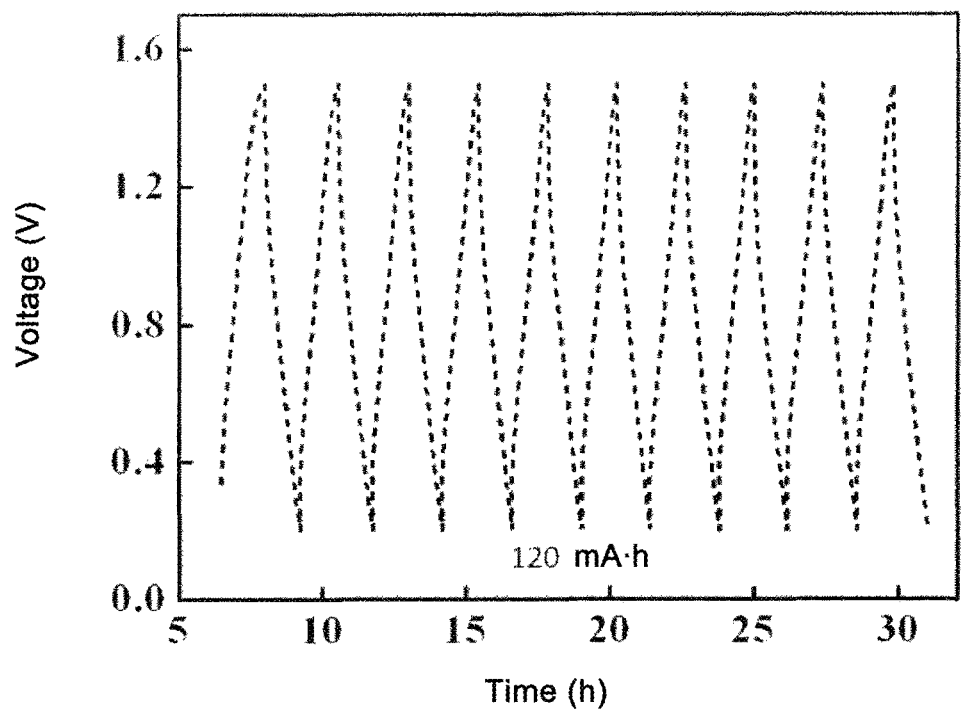
Figure 19:
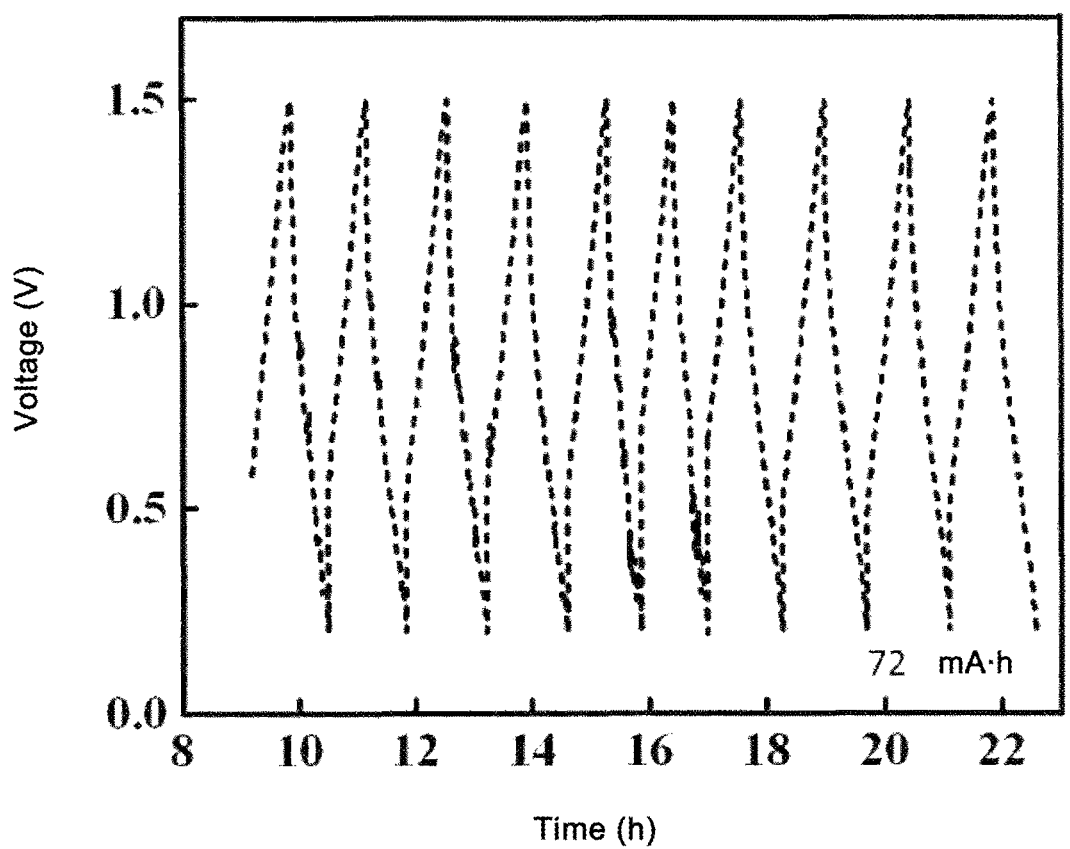
Figure 20:
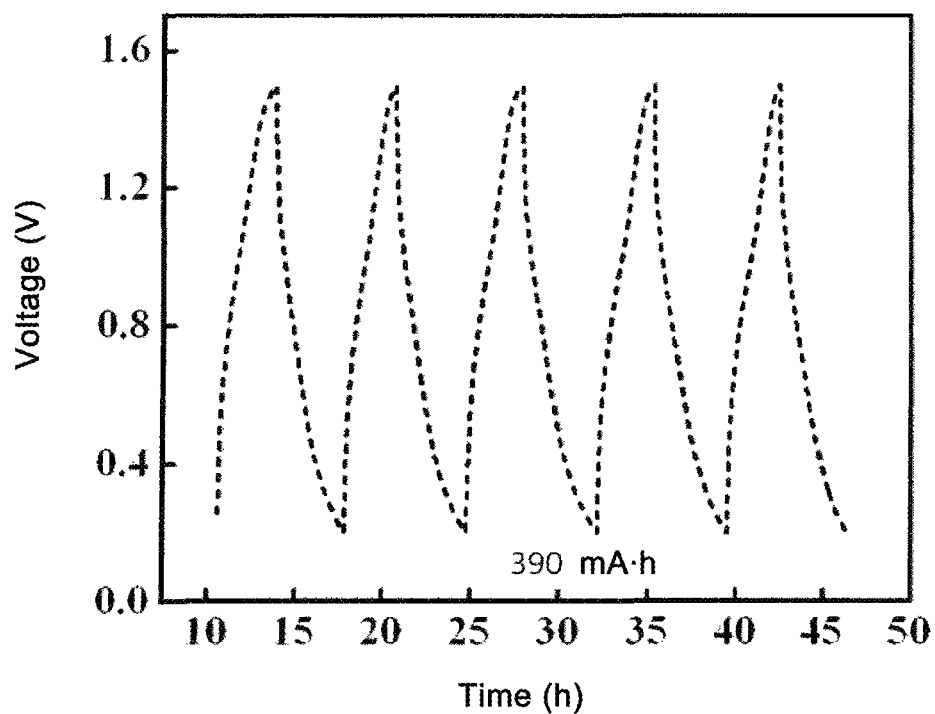
Figure 21:
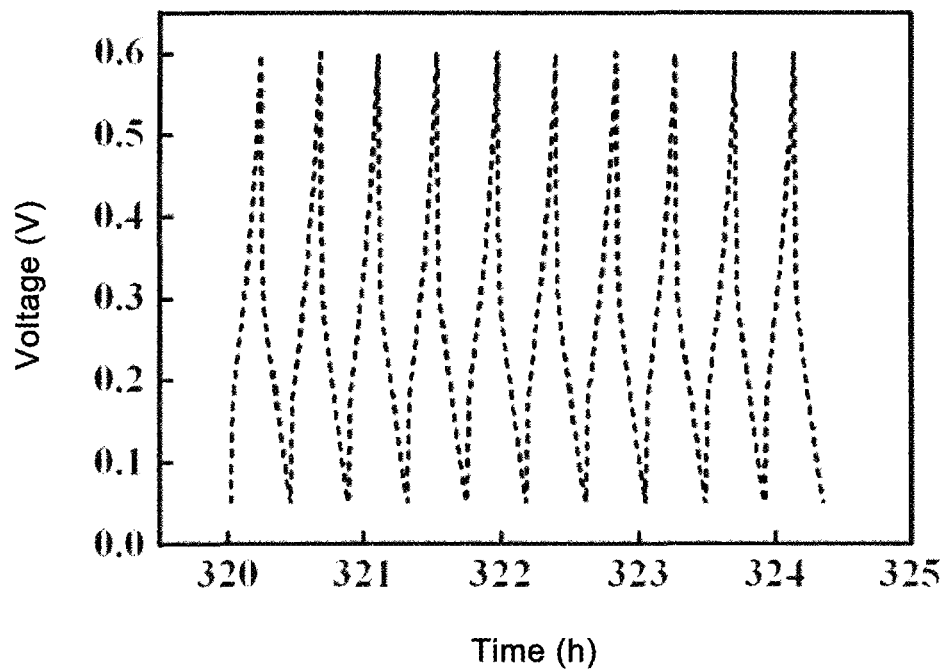
Figure 22:
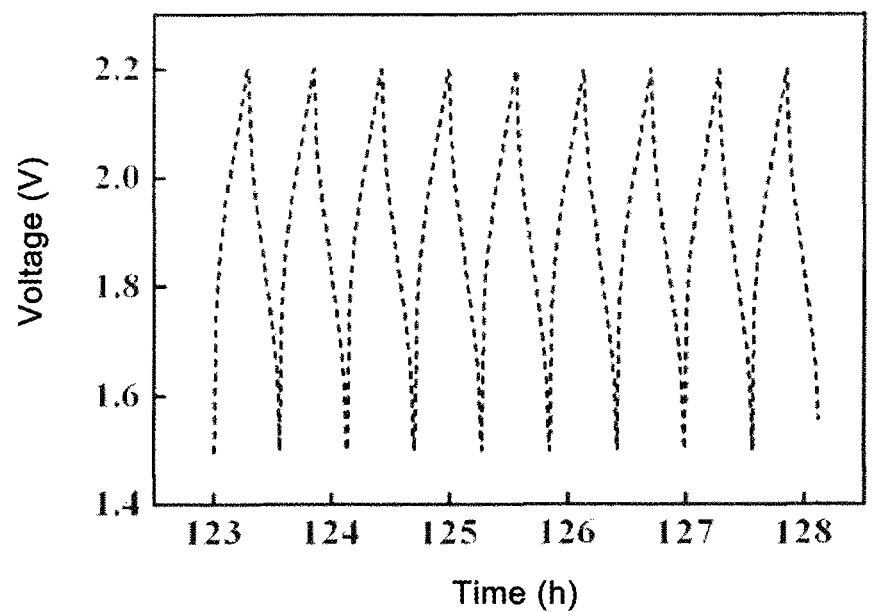
Figure 23:
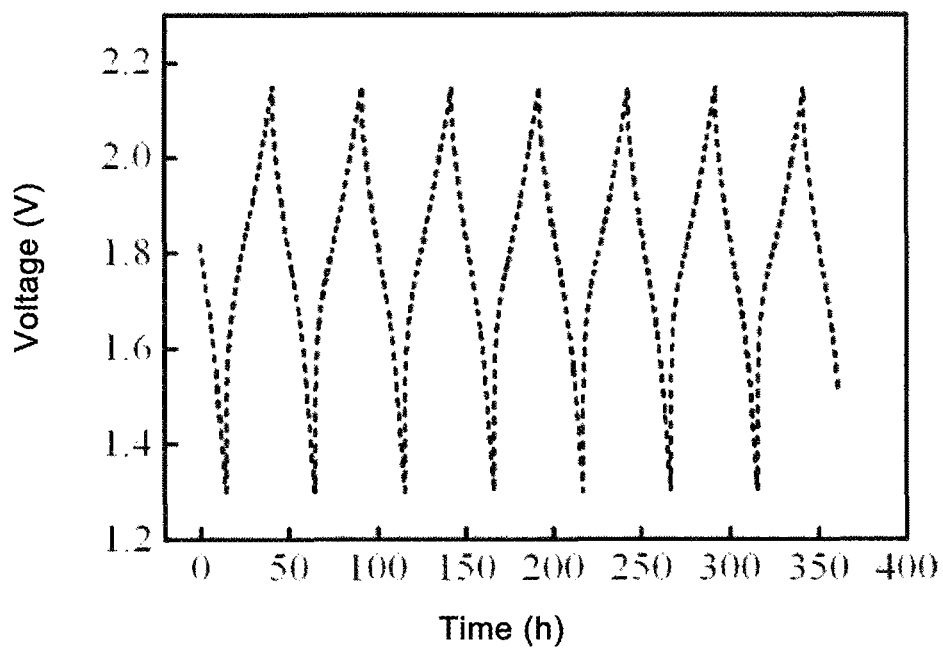
Figure 24:
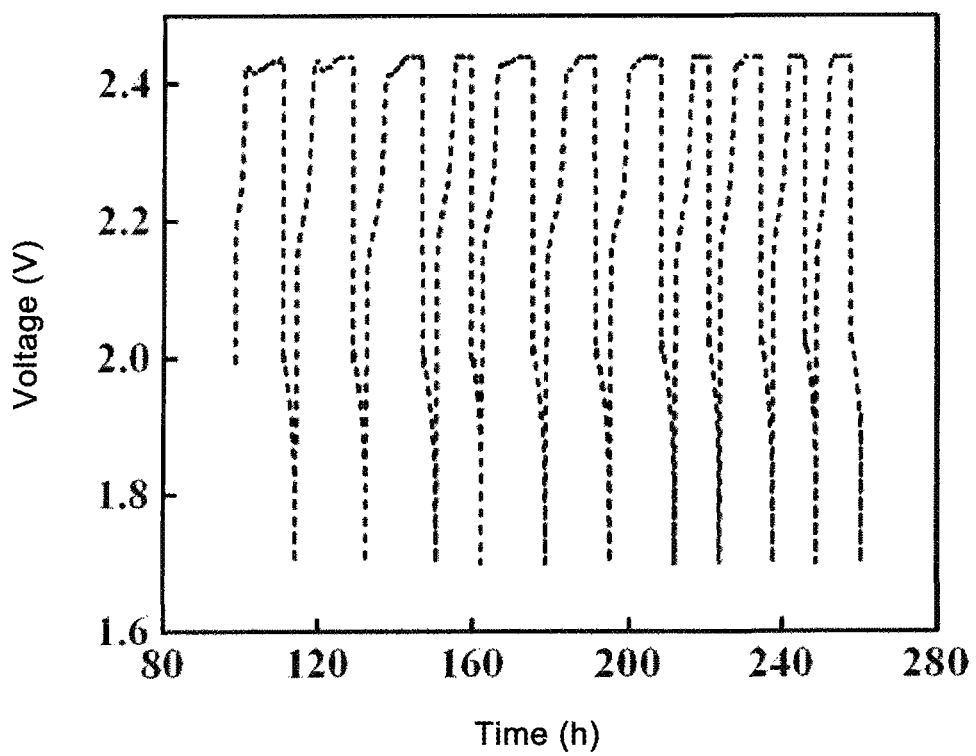
Figure 25:
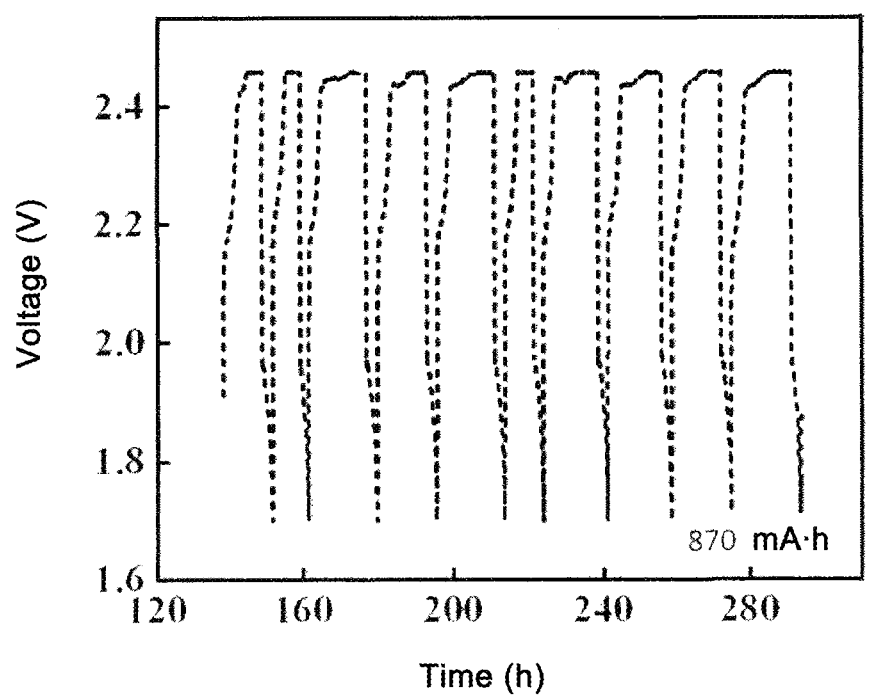
Figure 26:
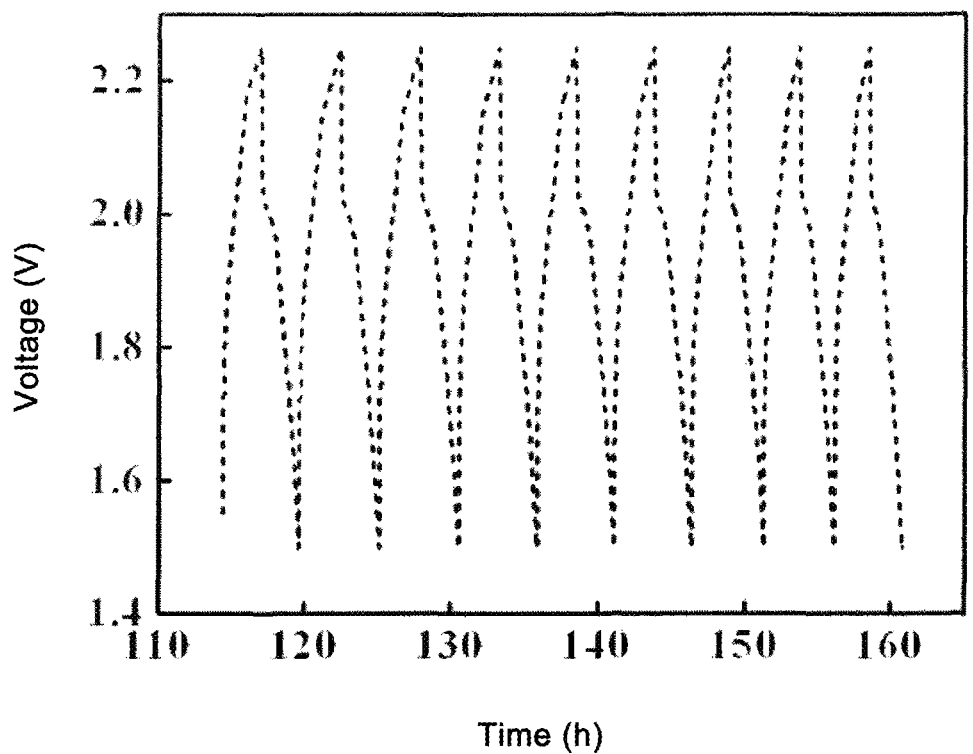
Figure 27:
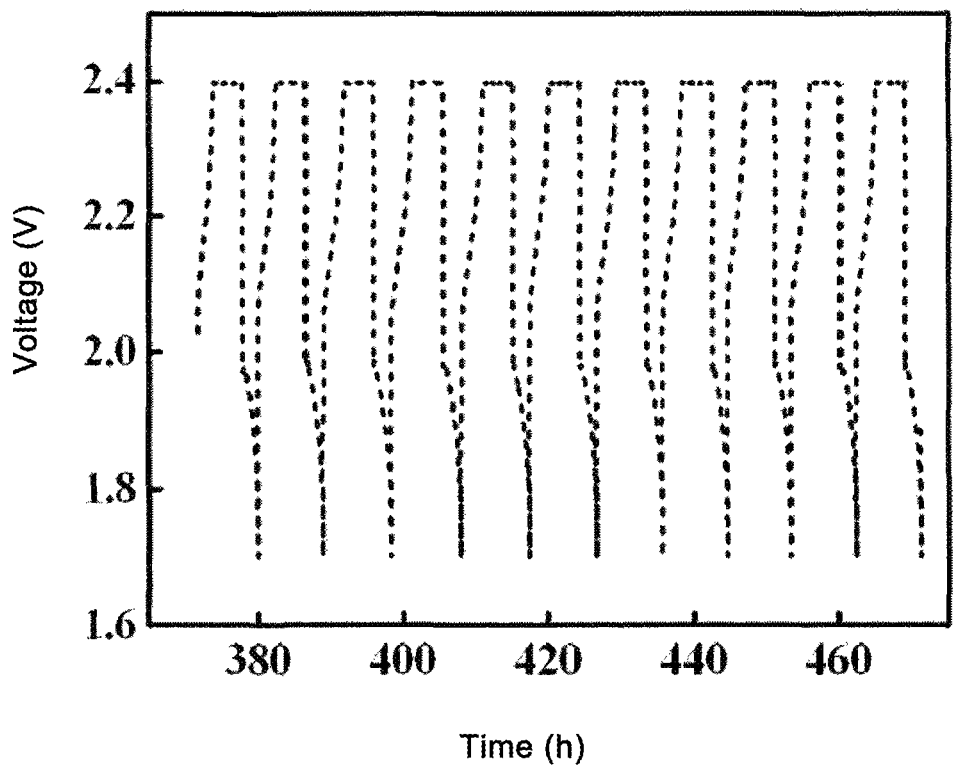
Figure 28:
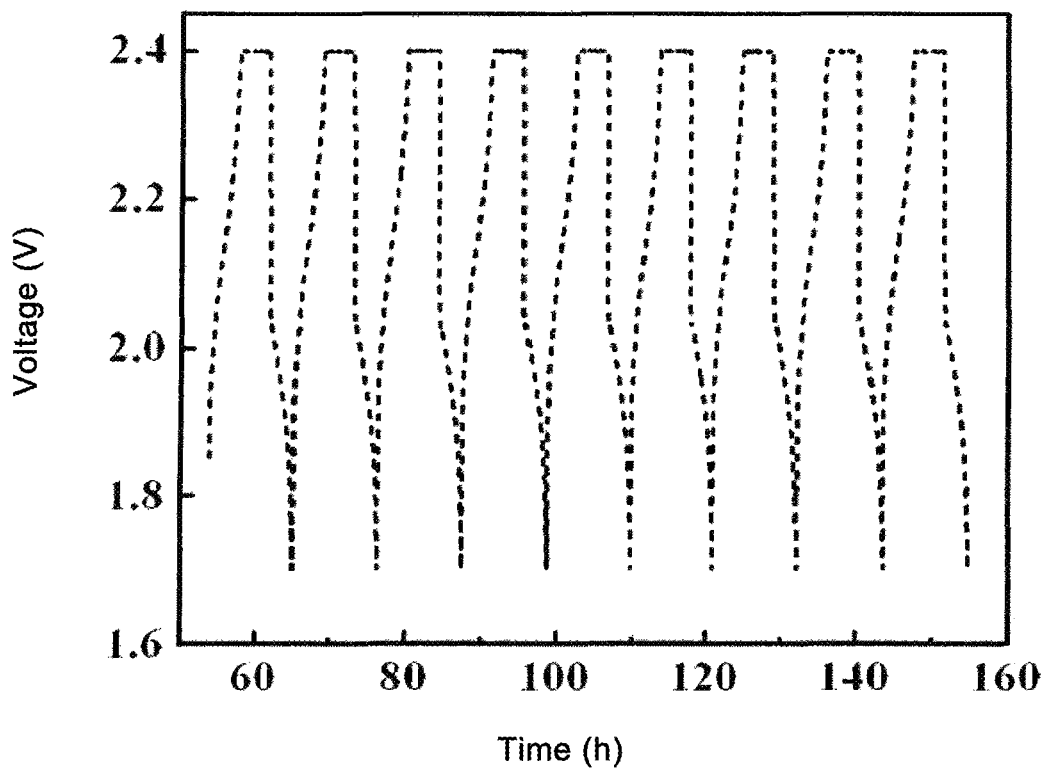
Figure 29:
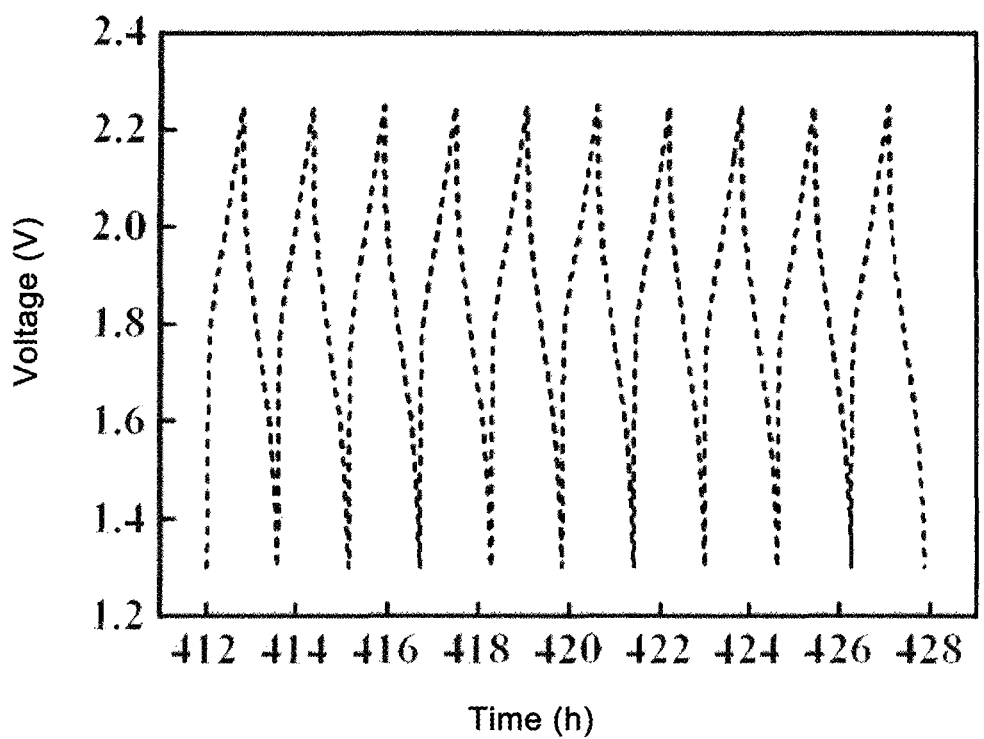
Figure 30:
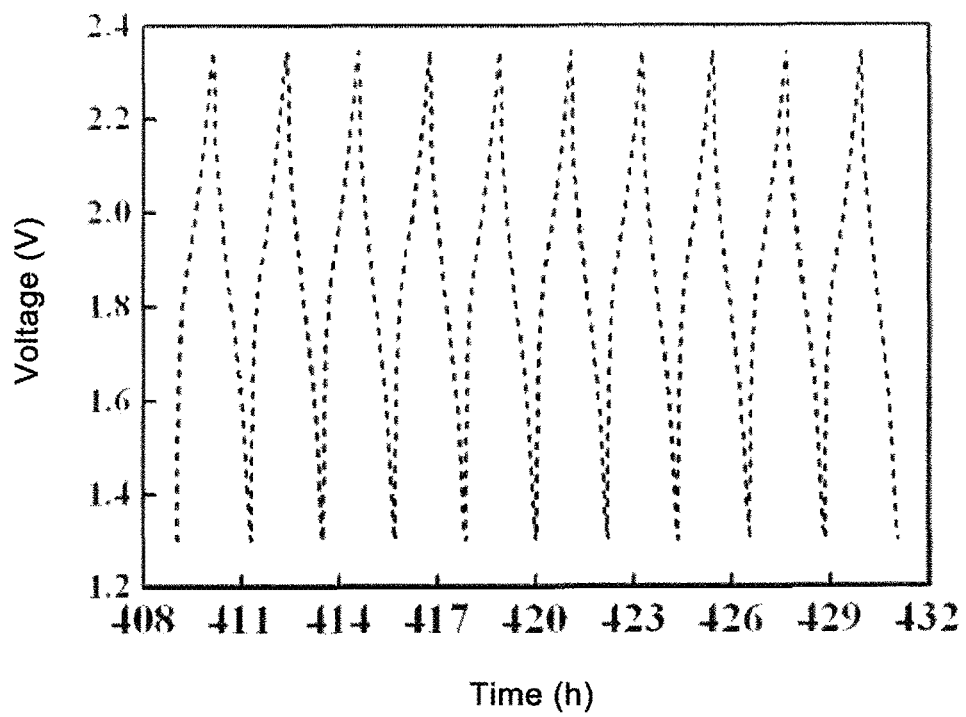
Figure 31A:
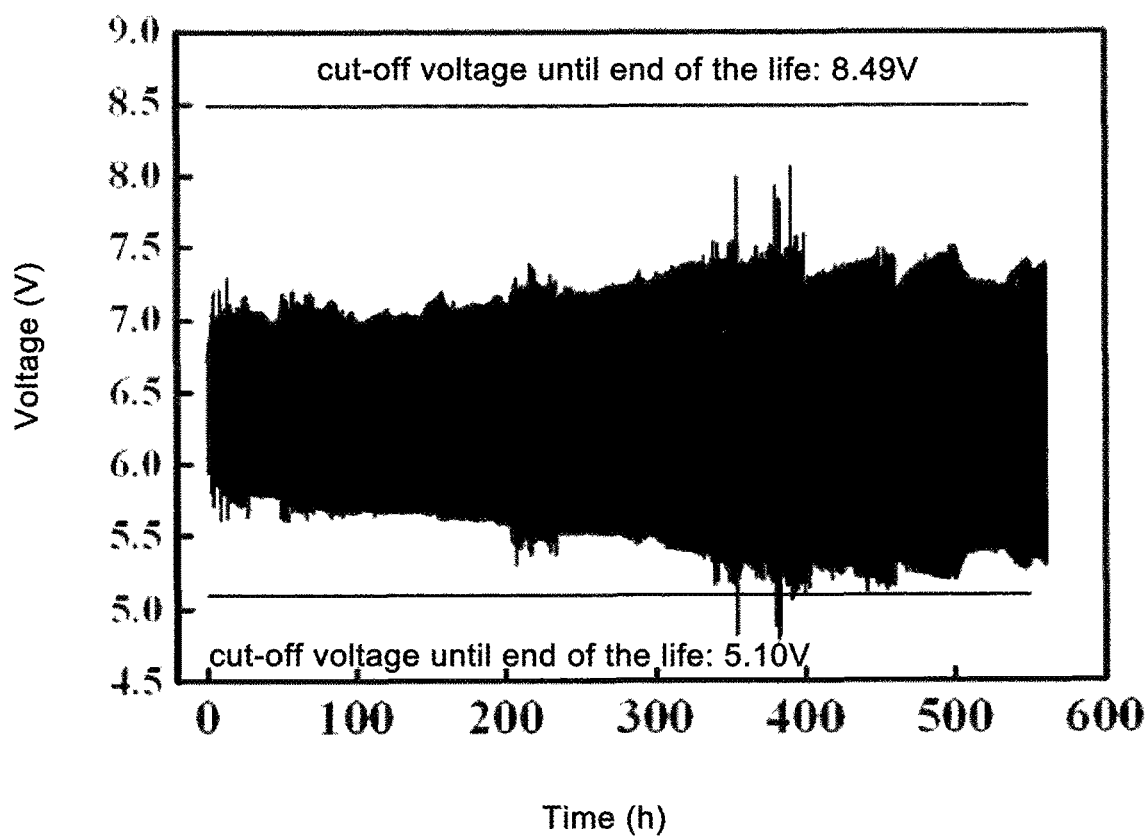
Figure 31B:
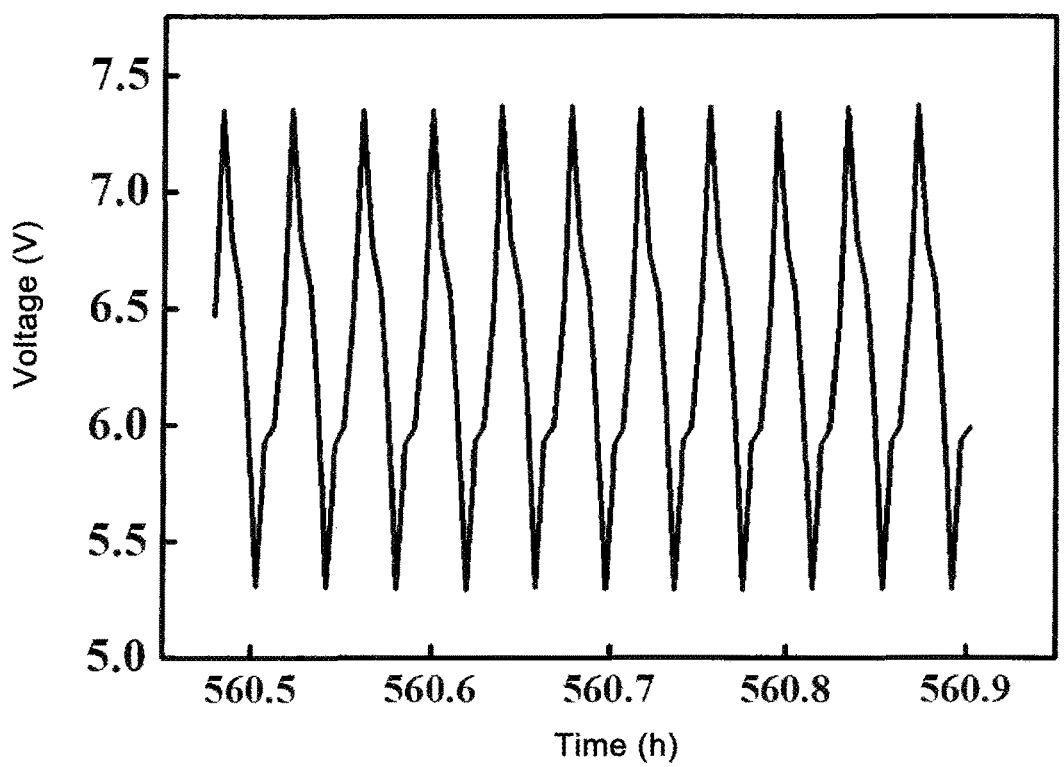
Figure 32A:
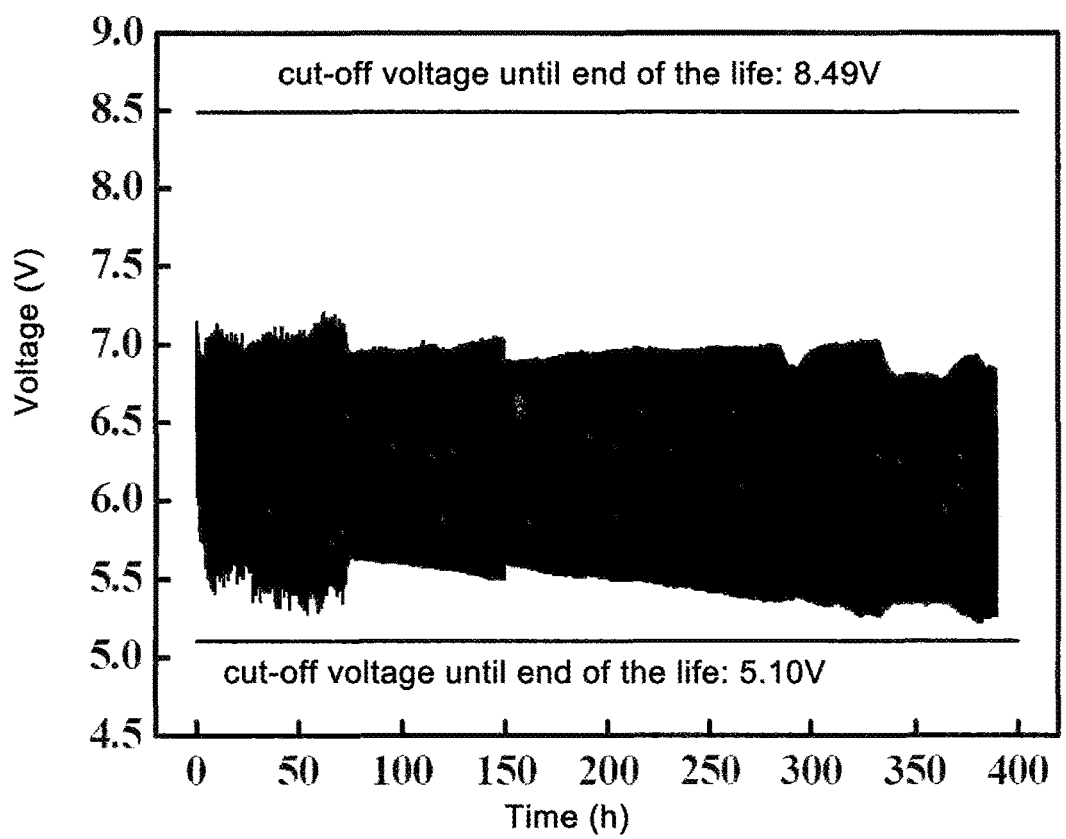
Figure 32B:
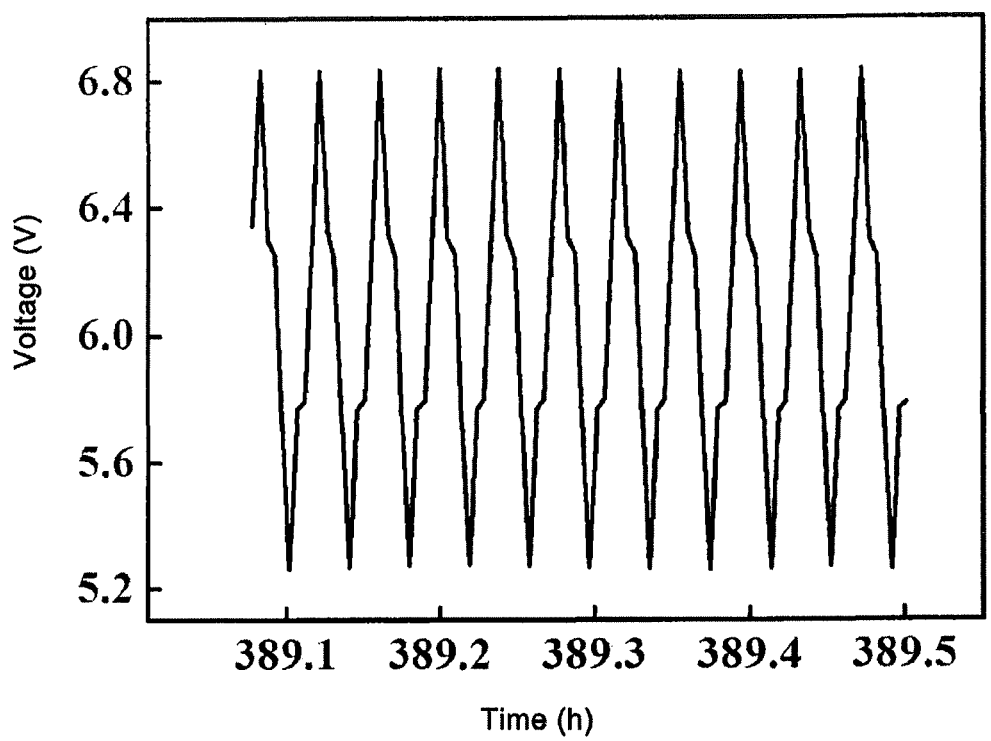
Figure 33A:
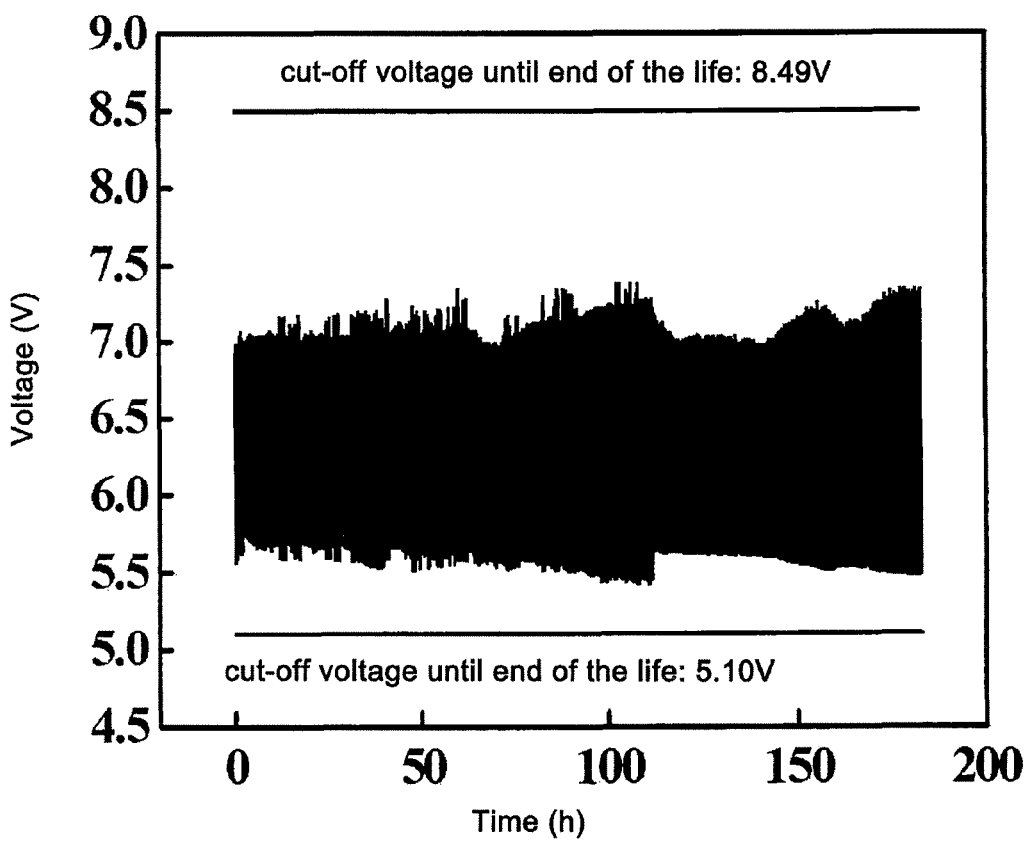
Figure 33B:
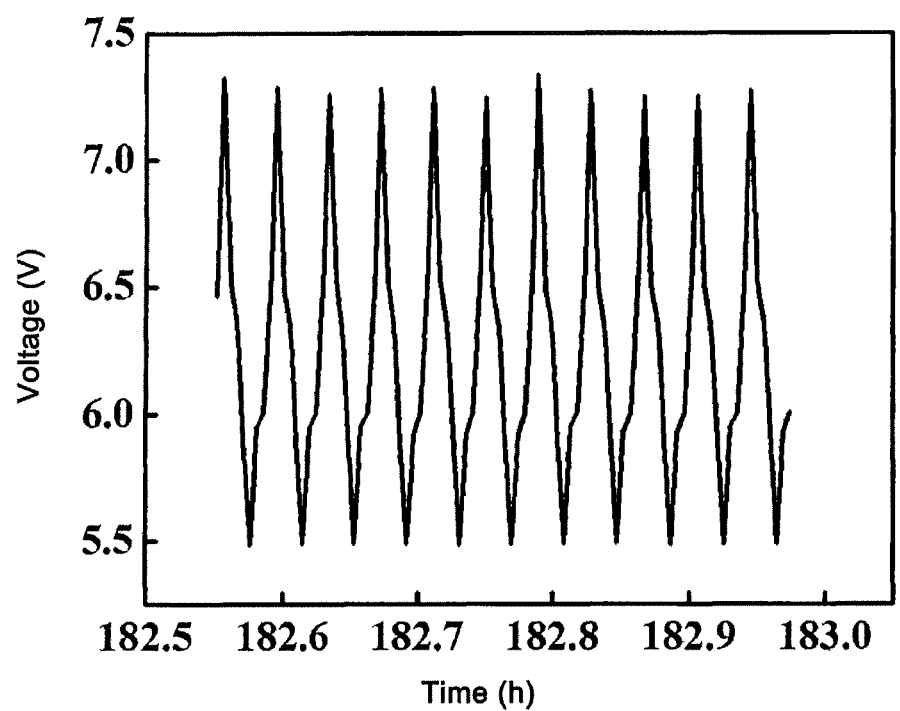

FIG. 11a, b, c show elemental analysis diagrams from energy dispersive x-ray spectroscopy of the tungsten element in doped tungsten oxide;

FIG. 12a, b, c show cyclic voltammograms (CVs) of super battery electrodes fabricated from three different tungsten oxide materials obtained in Example 1;

FIG. 13 show charge/discharge curves of two-electrode prototype super batteries obtained by three different tungsten oxide materials obtained in Example 1;

FIG. 14 shows CVs of tungsten oxide electrodes obtained in Example 2 within acid electrolytes at different concentrations;

FIG. 15 shows charge/discharge curves of two-electrode prototype super batteries obtained by the tungsten oxide material obtained in Example 2;

FIG. 16 shows charge/discharge curves of tungsten acid super battery fabricated by the tungsten oxide material obtained in Example 3;

FIG. 17 shows charge/discharge curves of tungsten acid super battery fabricated by the tungsten oxide material obtained in Example 4;

FIG. 18 shows charge/discharge curves of tungsten acid super battery fabricated by the tungsten oxide material obtained in Example 5;

FIG. 19 shows charge/discharge curves of tungsten acid super battery fabricated by the tungsten oxide material obtained in Example 6;

FIG. 20 shows charge/discharge curves of tungsten acid super battery fabricated by the tungsten oxide material obtained in Example 7;

FIG. 21 shows charge/discharge curves of tungsten acid super battery fabricated by the tungsten oxide material obtained in Example 8;

FIG. 22 shows charge/discharge curves of tungsten acid super battery fabricated by the tungsten oxide material obtained in Example 9;

FIG. 23 shows charge/discharge curves of tungsten acid super battery fabricated by the tungsten oxide material obtained in Example 10;

FIG. 24 shows charge/discharge curves of tungsten acid super battery fabricated by the tungsten oxide material obtained in Example 11;

FIG. 25 shows charge/discharge curves of tungsten acid super battery fabricated by the tungsten oxide material obtained in Example 12;

FIG. 26 shows charge/discharge curves of tungsten acid super battery fabricated by the tungsten oxide material obtained in Example 13;

FIG. 27 shows charge/discharge curves of tungsten acid super battery fabricated by the tungsten oxide material obtained in Example 14;

FIG. 28 shows charge/discharge curves of tungsten acid super battery fabricated by the tungsten oxide material obtained in Example 15;

FIG. 29 shows charge/discharge curves of tungsten acid super battery fabricated by the tungsten oxide material obtained in Example 16;

FIG. 30 shows charge/discharge curves of tungsten acid super battery fabricated by the tungsten oxide material obtained in Example 17;

FIG. 31a, 31b show CV curves of tungsten acid super battery fabricated by the tungsten oxide material obtained in Example 18 and charge/discharge curves after 15530 cycles, respectively;

FIG. 32a, 32b show CV curves of tungsten acid super battery fabricated by the tungsten oxide material obtained in Example 19 and charge/discharge curve after 10770 cycles;

FIG. 33a, 33b show CV curves of tungsten acid super battery fabricated by the tungsten oxide material obtained in Example 20 and charge/discharge curve after 5067 cycles;

DETAILED DESCRIPTION OF THE INVENTION

The following examples further illustrate the invention, but the present invention is not limited to these examples.

As mentioned above, in the present invention the tungsten trioxide material with a specific crystal structure can be used in electrochemical energy storage and conversion devices, and having a high power density, high energy density, and long cycle life. As mentioned earlier, such an electrochemical energy storage device comprises tungsten-carbon based super batteries, tungsten-lead oxide based super batteries, and tungsten-carbon/tungsten-lead oxide hybrid super battery systems. In these super battery systems, the negative electrode material is selected from the aforementioned tungsten-containing active materials, and the tungsten-based materials can be used as negative electrodes together with carbon or lead-based material.

As described above, the use of tungsten-based active material include tungsten oxide, hydrous tungsten oxide, element-doped tungsten oxide, element-doped hydrous tungsten oxide, tungsten oxide-based composite and mixtures comprising the foregoing tungsten-containing materials and carbon, polymer materials, metals and ceramics and mixture of these materials. Details of the following contents introduce the structure and construction method and such tungsten-based super batteries.

1. If the Electrochemical Energy Storage and Conversion Device is Tungsten Carbon-Based Super Battery:

The first type of super-batteries of the present invention is depicted in FIG. 1, FIG. 2A, FIG. 2B, FIG. 2C, and FIG. 2D. This type of super-batteries uses tungsten-based materials as the anodes, such as pure tungsten materials, mixture of tungsten materials and lead, and mixture of tungsten materials and carbon; uses the same tungsten-based materials or porous carbons as cathodes. The super batteries described in the present invention can provide high power density, super long cycling life and considerable energy storage density.

Figure 1:
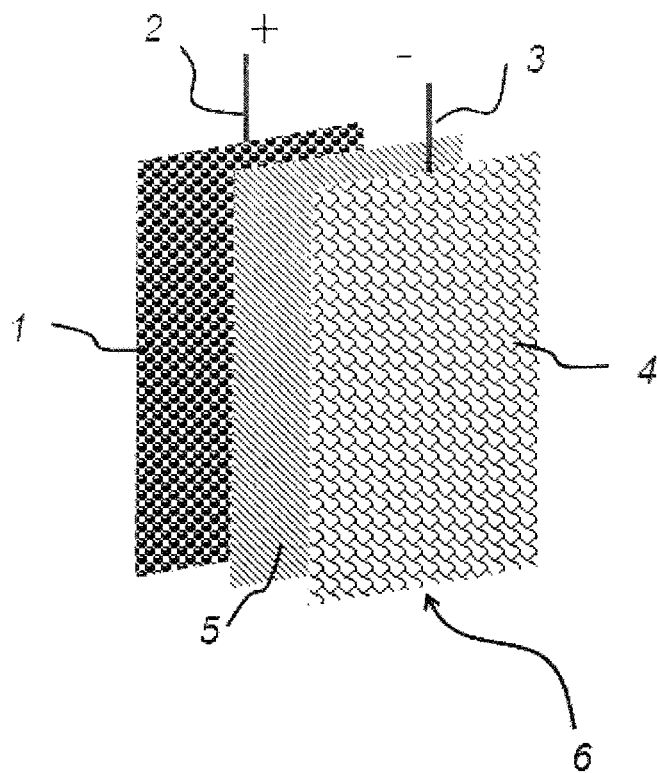

Super battery shown in FIG. 1 includes a cathode current collector 2, an anode current collector 3, tungsten-material-based negative electrode 4, a porous separator 5, high surface area carbon or the same tungsten electrode as a positive electrode 1 and electrolyte filling in between. Wherein, the separator may be a variety of stable and insulating porous membranes such as glass fiber, nonwoven fabric, etc. The membrane plays the role of isolating positive and negative electrodes; the current collectors required for the preparation of electrodes may be various stable and electronic conductive substrates, such as carbon felt, titanium foil, lead grid, etc. They play a role in the collection and conduction electrons. The electrolyte can be various aqueous or organic solutions containing sufficient electrolyte ion concentration and a high ionic conductivity; preferred electrolyte is aqueous electrolyte containing a sufficient concentration of protons, such as sulfuric acid, phosphoric acid, perchloric acid, etc. It plays a role of providing protons.

The carbon material for positive electrode may be a variety of porous carbons, which could be selected from activated carbon, carbon nanotubes, carbon nanofibers, graphene or other porous carbon sources. It provides an electric double layer capacitance in the super battery.

Those skilled in the art can readily understand that the tungsten-based active materials in the present invention may be synthesized by different methods, and the material is then processed into a powder to prepare electrodes. The specific synthetic methods, as an example, will be described in detail below.

In the present invention, the method of using tungsten-based materials in the tungsten-carbon-based super battery is to take the as-prepared tungsten-based active material in the powder form, conductive agent, a binder and a dispersing agent to formulate into a uniform electrode slurry, and then apply the electrode slurry onto the current collector to form the tungsten-material-based anode, the specific preparation method, as an example, will be described in detail below.

FIG. 2 also shows a tungsten-carbon super battery. The super battery structure comprises tungsten-based and lead-based anode material, separator, high surface area carbon cathode and electrolyte. FIG. 2A shows the structure composition of the negative electrode, wherein the upper and lower portion is tungsten-based and lead-based active material 10, 11, respectively, and the proportion of each part of the active material and position can be changed to the needs accordingly. As an example, a possible method of manufacturing the negative electrode is to prepare the tungsten-containing active material or lead in accordance with the aforementioned method to form electrode slurries separately; and then wherein said one electrode slurry is coated on a current collector as the first portion at some position, then said another electrode slurry is coated on the other part of the collector of the other portion of the electrode. Other materials to make the super battery with tungsten-containing and lead containing hybrid negative electrodes including high surface area carbon cathode 7, separator 12, and the electrolyte material are the same as the aforementioned super battery shown in FIG. 1.

Figure 2A:
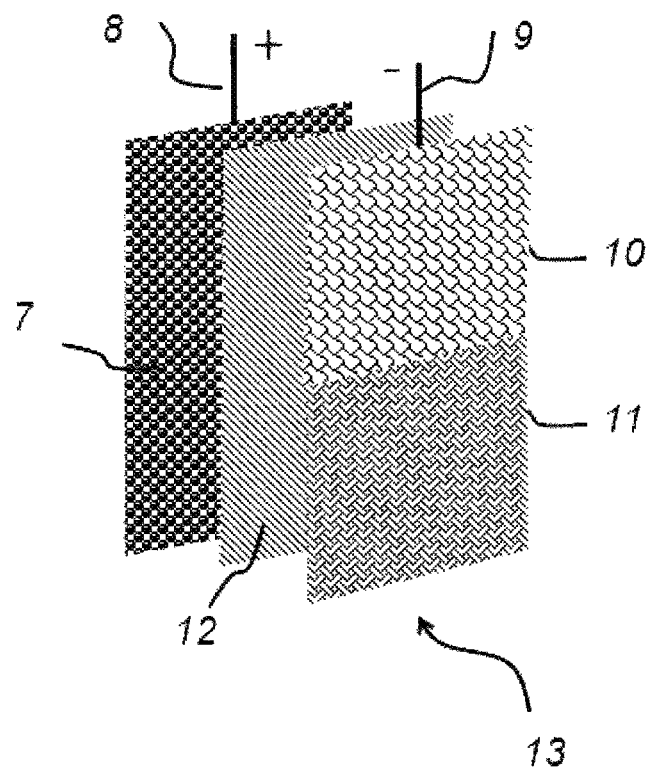
Figure 2B:
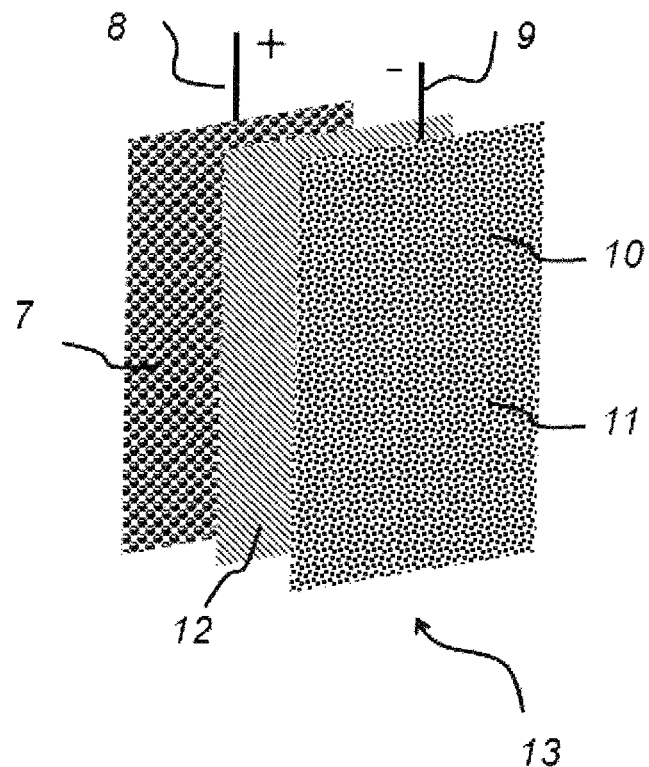
Figure 2C:
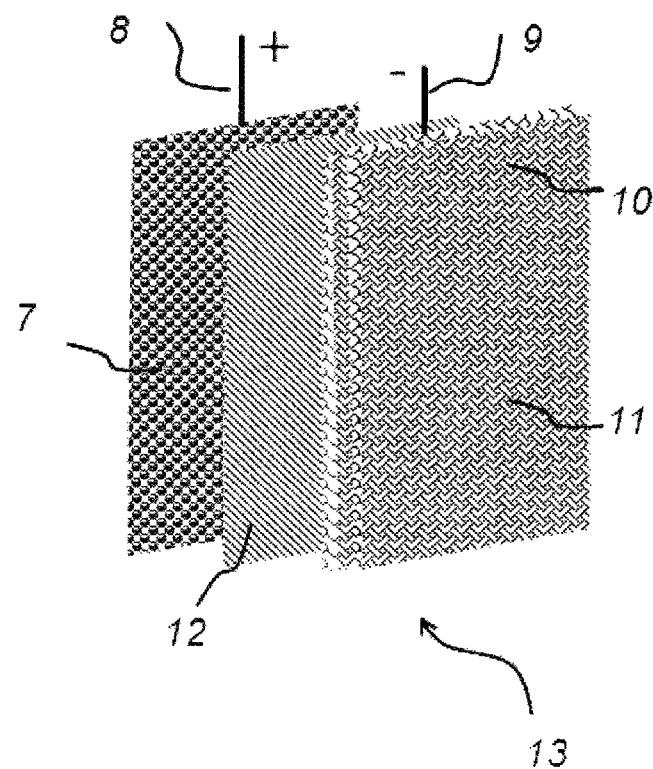

Super battery structure shown in FIG. 2B includes tungsten-lead-based hybrid negative electrode 10, 11, separator 12, high surface area carbon cathode 7 and the electrolyte. The active material used in the hybrid tungsten-lead negative electrode can be a mixture of tungsten material and lead material in any proportion or homogenous composite material. Possible manufacturing method for the hybrid negative electrode is to take the tungsten-containing active material and lead material to make uniform slurry according to the aforementioned method; and then coat the electrode slurry with the mixed material to the current collector to form a hybrid electrode structure. Other materials to make the super battery with hybrid tungsten-lead negative electrode including high surface area carbon cathode 7, separator 12 and the electrolyte material are the same as the aforementioned super battery shown in FIG. 1.

Super battery structure shown in FIG. 2O includes negative electrode 10, 11 that are constructed by alternating tungsten-based active layers and lead-based active layers, separator 12, high surface area carbon cathode 7 and the electrolyte filled in. As shown in FIG. 2O, the wherein said super battery anode can be constructed by alternatively coating tungsten-based active layers and lead-based active layers, or by alternatively coating tungsten-based active layers and carbon-based active layers, or by alternatively coating lead-based active layers and carbon-based active layers, or by alternatively coating tungsten-based active layers, lead-based active layers and carbon-based active layers. The thickness, number of layers and coating sequence of each active layer can be adjusted as needed without limitation. Possible method for manufacturing the hybrid negative electrode is to take the tungsten-containing material or lead material or high surface area carbon as active materials to form an electrode slurry in accordance with the aforementioned method; then the above electrode slurry of hybrid material is layer-by-layer coated on the current collector to form layered hybrid electrodes according to the foregoing designed sequence, thickness and number of layers. Other materials to make the super battery with hybrid tungsten-lead negative electrode including high surface area carbon cathode 7, separator 12 and the electrolyte material are the same as the aforementioned super battery shown in FIG. 1.

Figure 2D:
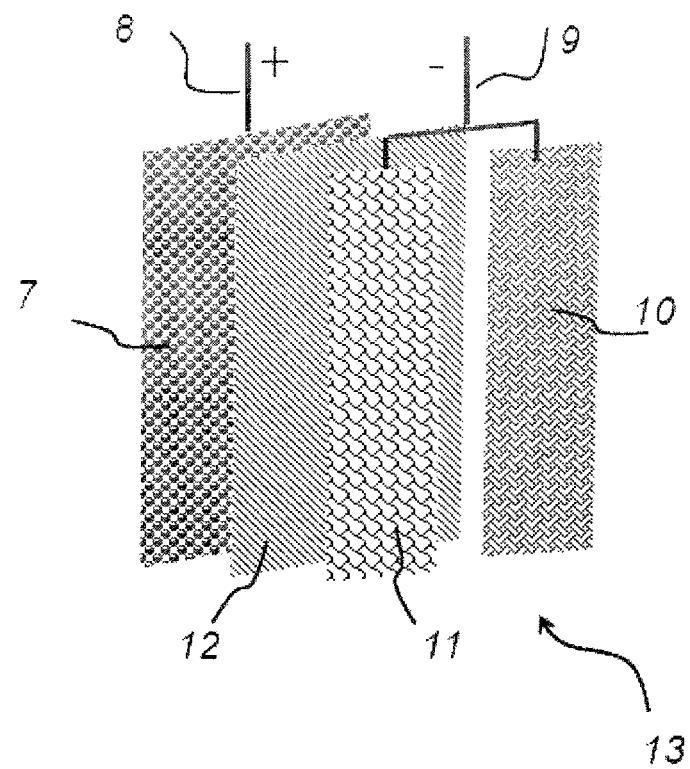

Super battery structure shown in FIG. 2D includes tungsten-based anode (or tungsten-based active material) 10 and lead-based anode (or lead-based active material) 11 connected in parallel, separator 12, high surface area carbon cathode 7 and electrolyte filled in. As shown in FIG. 2D, the negative electrode of the super battery consists of two separately formed electrodes that are connected in parallel; wherein one electrode is made of tungsten-containing material, the other electrode is made from lead material. Location and size of the two electrodes can be adjusted without limitation depending on design requirements. Possible manufacturing method for the hybrid negative electrode is to take the tungsten-containing active material and lead-containing materials to make electrode slurry separately according to the aforementioned method; then the above electrode slurries are separately coated on a current collector to form each individual electrode. The as-formed tungsten electrode and the lead electrode are then connected together to constitute a negative electrode of a super battery. Other materials to make the super battery with hybrid tungsten-lead negative electrode including high surface area carbon cathode 7, separator 12 and the electrolyte material are the same as the aforementioned super battery shown in FIG. 1.

Likewise, one skilled in the art can readily understand that the selection of separator, carbon-based cathode and the electrolyte of the super battery illustrated in the FIG. 2 are conventional choice to those skilled in the field. The specific selection can be referred to the description of FIG. 1. At the same time, a special note is, the hybrid tungsten-lead anode described in FIG. 2 may be replaced by a hybrid tungsten-carbon anode wherein the structure is similar.

To further illustrate how the embodiment of the present invention is executed, in the following example the preparation method and performance of the tungsten-carbon super batteries (FIG. 1) based on tungsten oxide anode and carbon cathode will be described in detail:

Example 1

First, the synthesis and specific characterization of tungsten oxide as follows:

(1) Preparation of Tungsten Oxide.

Figure 6:
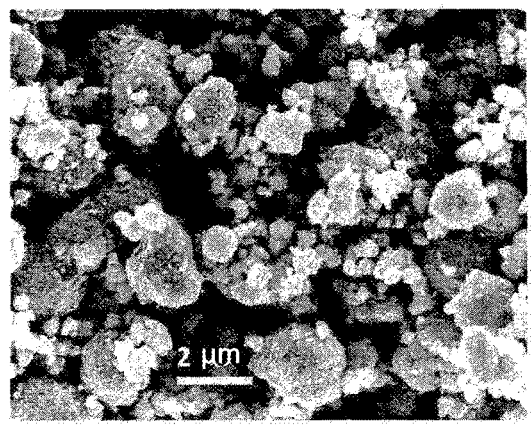

(A) Ammonium tungstate is dissolved in deionized water to form 3 wt. % of ammonium tungstate solution, and then 2 molar sulfuric acid solution is added to adjust acid concentration to 1.5 wt. %. The above solution is stirred for 30 minutes to obtain a homogenous mixed solution; the mixed solution is transferred to a 5 liter autoclave reactor and heated at 95° C. for 60 hours; after the reaction completion it is allowed to cool naturally, then the product is washed with deionized water and dried to obtain hydrous tungsten oxide active material for electrode use. To further understand the morphology and structure of the prepared hydrous tungsten oxide material, the applicant performed TEM and XRD characterization, and results are as follows:

FIG. 6 is the SEM image of the hydrous tungsten oxide material obtained by using the aforementioned synthesis manner. As seen in FIG. 6, the particle size of the hydrous tungsten oxide is in the range of a few hundred nanometers to micrometer level, wherein each individual particle consists of a large number of nanoparticles. The size of the nanoparticle is in the range of several nanometers to several tens of nanometers.

Figure 7:
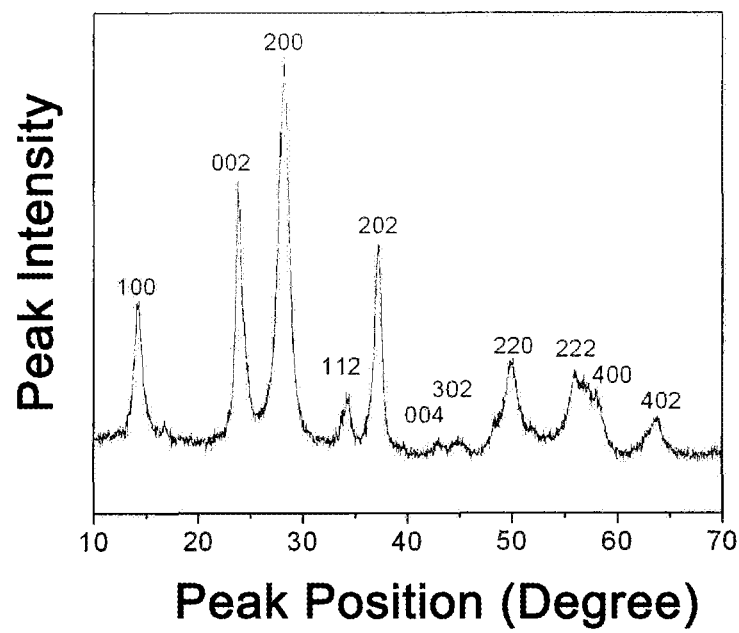
FIG. 7 is an X-ray diffraction (XRD) pattern of the hydrated tungsten oxide material obtained in the Example 1 (A)

FIG. 7 is the XRD pattern of the hydrous tungsten oxide material obtained by using the aforementioned synthesis manner. The hydrous tungsten oxide sample has a hexagonal crystal structure.

Figure 8:
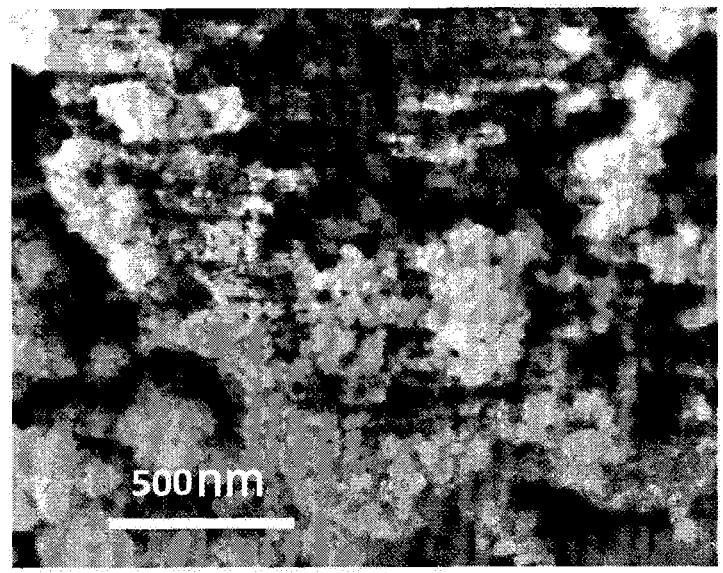
FIG. 8 is a SEM image of the tungsten oxide material obtained in the Example 1 (B)
Figure 9:
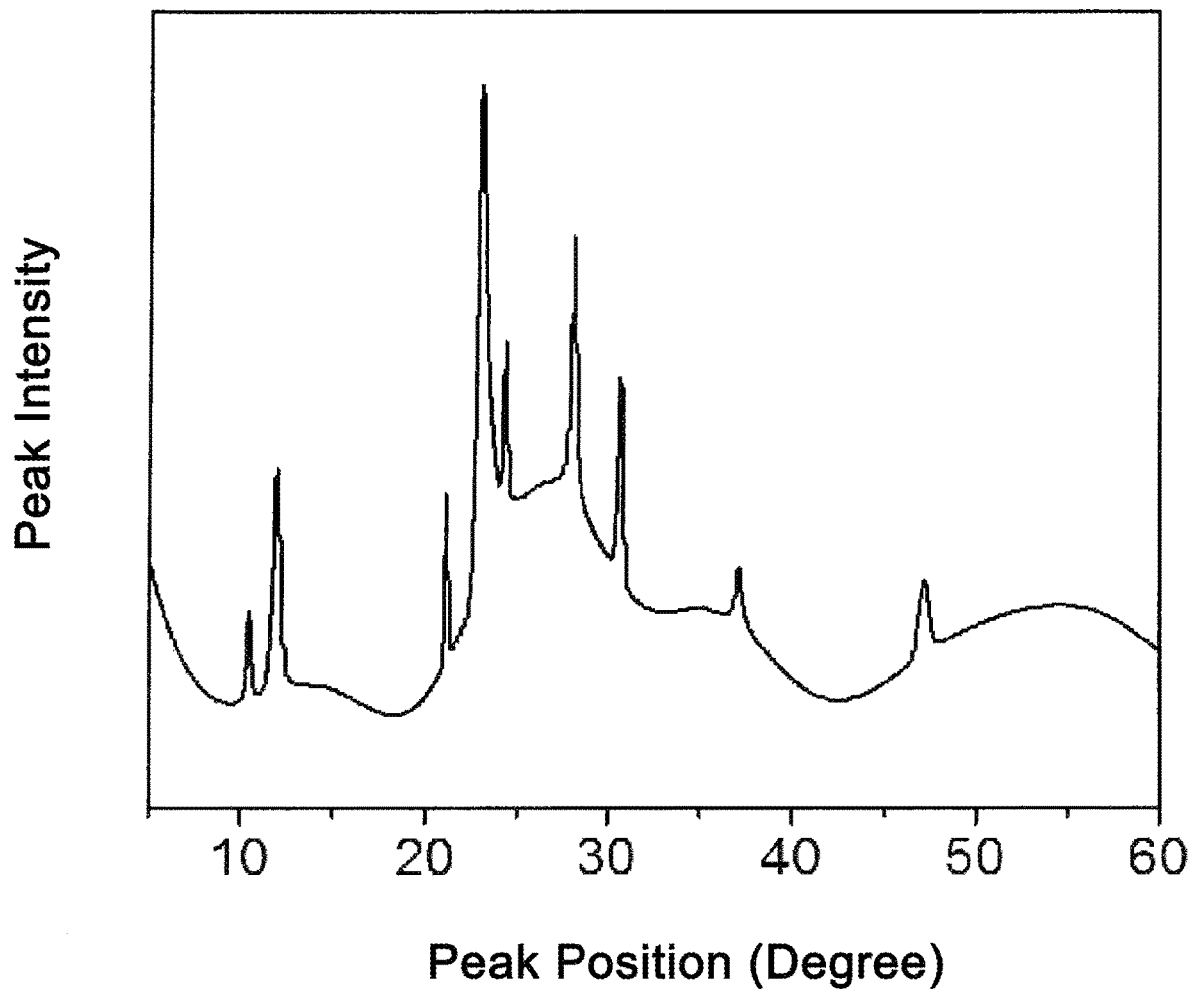
FIG. 9 is an XRD pattern of the tungsten oxide material obtained in the Example 1 (B)

(B) Sodium tungstate is dissolved in deionized water to form 3 wt. % sodium tungstate solution, and then 2 molar hydrochloric acid solution is added to adjust acid concentration to 1.5 wt. % followed by the addition of 2 wt. % of potassium sulfate. The above solution is stirred for 30 minutes to obtain a homogenous mixed solution, and the mixed solution is transferred to an autoclave reactor and heated at 180° C. for 12 hours; after the reaction completion it is allowed to cool naturally, then the product is washed with deionized water and dried to obtain mixed tungsten oxide material having both a cubic and hexagonal crystal structures. To further understand the morphology and structure of the prepared hydrous tungsten oxide material, the applicant performed TEM and XRD characterization, and results are as follows:

FIG. 8 is the SEM image of the mixed tungsten oxide material having both a cubic and hexagonal crystal structures obtained by using the aforementioned synthesis manner. The sample shows small size nanoparticles with size in the range of several nanometers to several tens of nanometers. FIG. 9 is the XRD pattern of the same mixed tungsten oxide material. As seen from FIG. 9, the tungsten oxide sample has mixed crystal structures of both hexagonal and cubic crystal structures.

Figure 10A:
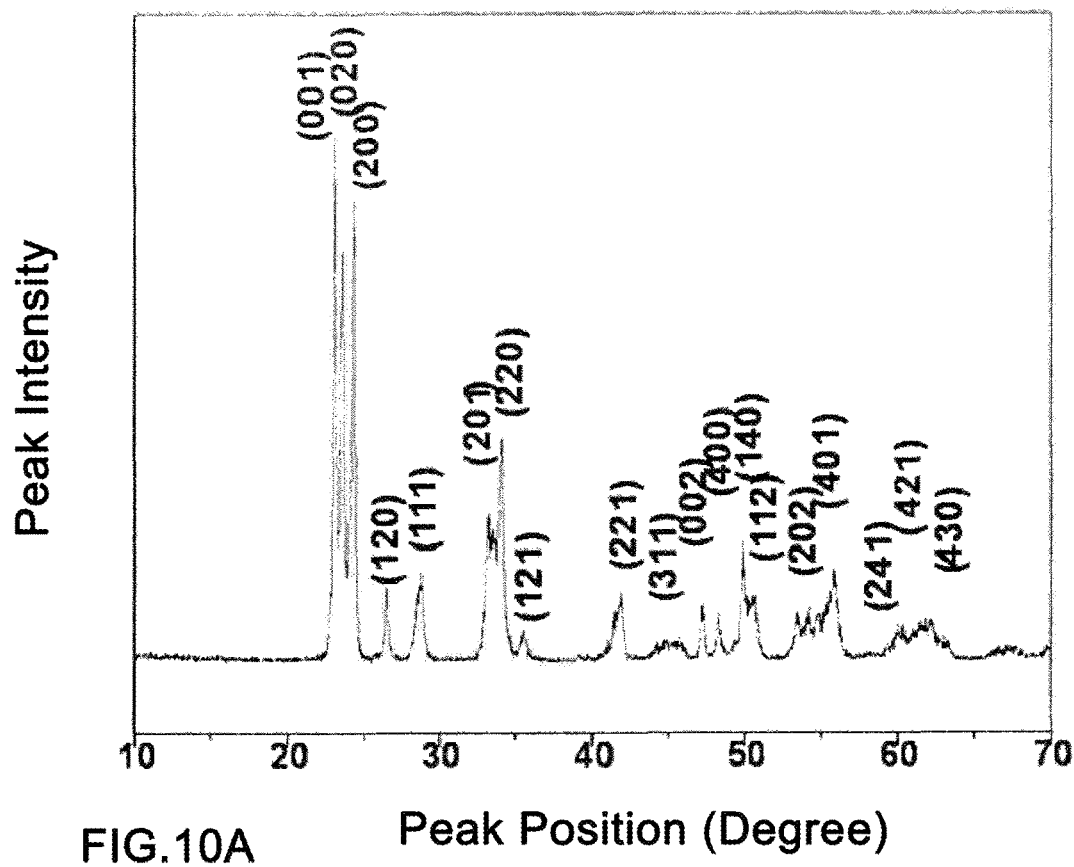
FIG. 10a is XRD pattern of a commercial tungsten oxide sample.
Figure 10B:
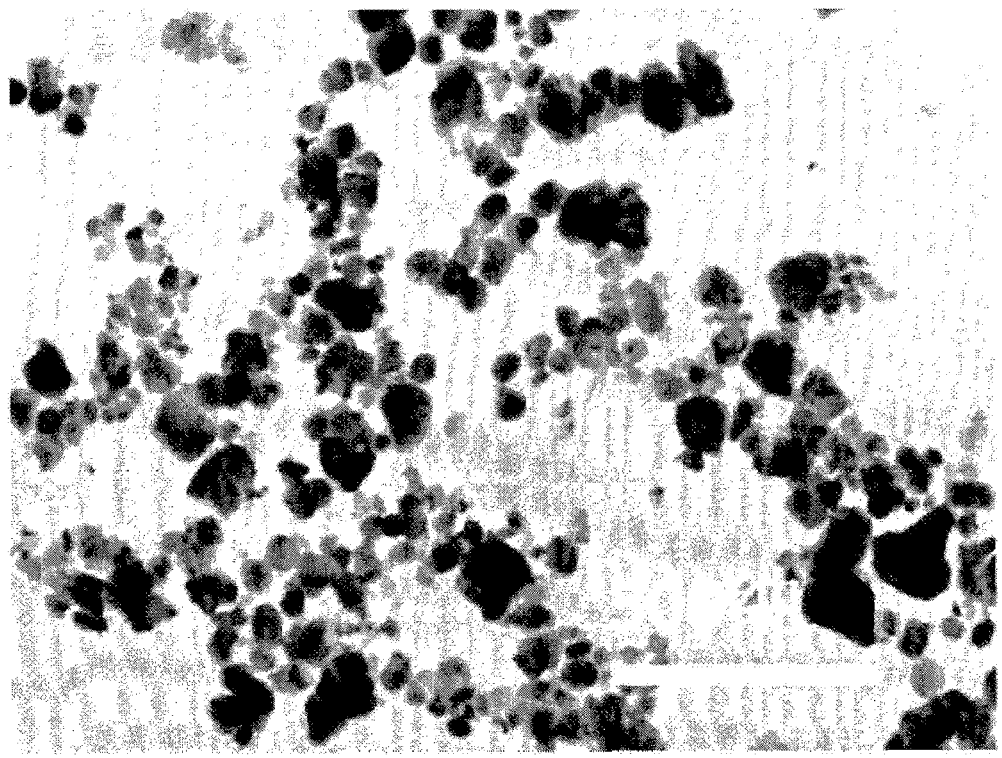
FIG. 10b is a transmission electron microscopic (TEM) of a commercial tungsten oxide sample.

At the same time, the applicant purchased a commercially available tungsten oxide sample with CAS Number 1314-35-8, which has an orthorhombic crystal structure. FIG. 10 shows its XRD (a) and a transmission electron microscopic image (b), indicating that the sample particles have a similar nanosize with the prior two tungsten oxides, and have an orthorhombic crystal structure.

Doped tungsten oxides can be prepared by soaking tungsten oxide in salt solutions containing different doping elements. For example, tungsten oxide is well dispersed in a 6 mole per liter zinc chloride aqueous solution, after centrifugation the resulting precipitate was heat treated at 400° C. for 6 hours to obtain a zinc-doped tungsten oxide (FIG. 11 (*a*)); tungsten oxide is well dispersed in a 6 mole per liter calcium chloride aqueous solution, after centrifugation the resulting precipitate was heat treated at 400° C. for 6 hours to obtain a calcium-doped tungsten oxide (FIG. 11 (*b*)); the reaction product from (A) is collected by centrifugation (without washing), and then heat treated at 400 degrees for 6 hours to obtain sodium-doped tungsten oxide (FIG. 11 (*c*)).

To further understand the above-mentioned three different tungsten oxide materials, as the electrode, for tungsten-carbon-based super battery application, the applicant then prepared electrodes using these three tungsten oxide materials, and further studied of their performance:

(2) Fabrication of Tungsten Oxide Electrodes and Carbon Electrodes.

Each of the above three different tungsten oxides, carbon black as a conductive agent, and polyvinylidene fluoride (PVDF) binder in mass ratio of 8:1:1 is dispersed in an appropriate amount of the N-Methyl-2-pyrrolidone (NMP) solvent under stirring and mixing to obtain homogenous tungsten oxide electrode slurries. Each of this electrode slurry is coated onto titanium sheet current collectors, and dried under vacuum at 80° C. for 2 hours to form the tungsten oxide electrodes.

Meanwhile, the specific method of preparing carbon electrodes is as follows: the high surface area activated carbon, carbon black conductive agent, and PVDF binder in mass ratio of 9:0.5:0.5 is dispersed in an appropriate amount of the NMP solvent under stirring and mixing to obtain homogenous carbon electrode slurry. This electrode slurry is coated onto titanium sheet current collectors, and dried under vacuum at 80° C. for 5 hours to form the carbon electrodes.

(3) Fabrication of Tungsten Super Battery.

Figure 12B:
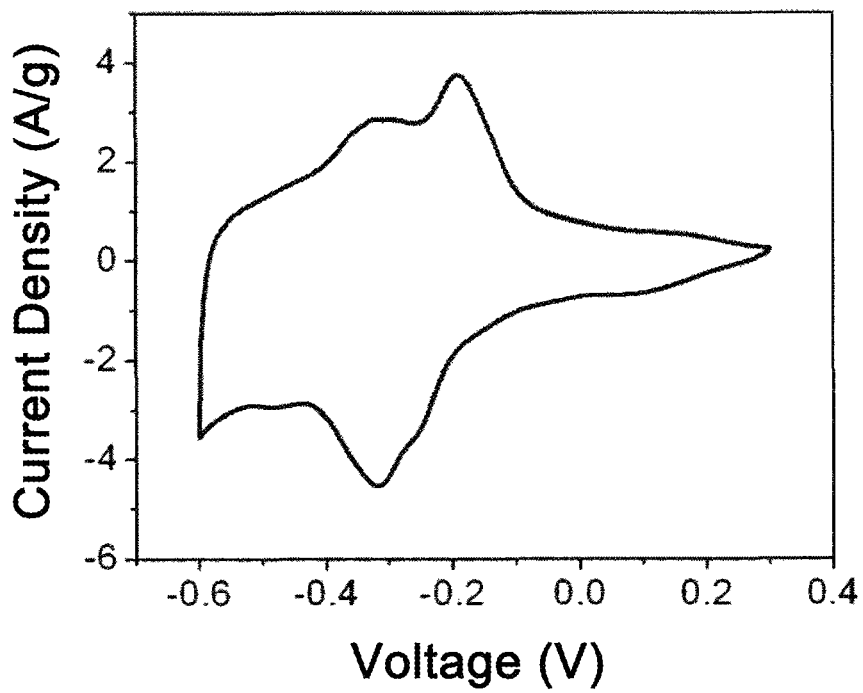
Figure 12C:
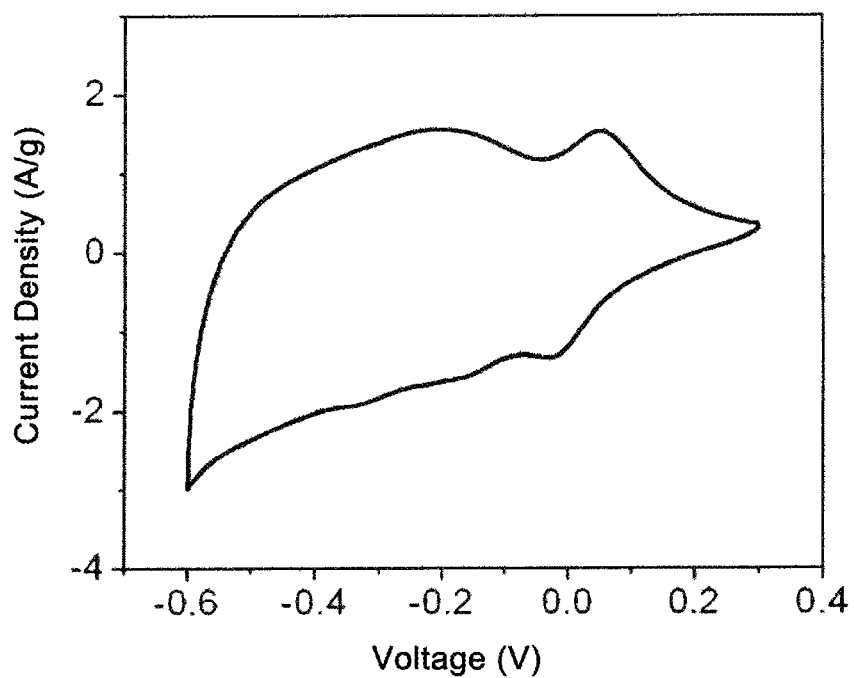

The above three different tungsten oxide negative electrodes were assembled and tested in three-electrode cells. The used three-electrode system comprises a tungsten electrode, a reference electrode and a counter electrode. Three different tungsten trioxides were respectively used as negative electrodes in 2 mole/L of sulfuric acid electrolyte, Ag/AgCl electrode as the reference electrode and a platinum sheet as the counter electrode to perform electrode test. When the electrode mass loading is 1~3 mg/cm$^2$ for electrodes prepared under the same condition and cyclic voltammetric scan rate is 5 mV/s in a three-electrode cell, the capacity of tungsten oxide electrode having a hexagonal crystal structure is 70 mAh/g; the capacity of tungsten oxide electrode having mixed crystal structures of hexagonal and cubic crystal structure is 83 mAh/g; the capacity of tungsten oxide electrode having a orthorhombic crystal structure is 56 mAh/g. FIG. 12 show CV curves of different electrodes, wherein FIG. 12*a* shows CV curve of hexagonal crystal tungsten oxide, FIG. 12*b* shows CV curve of orthorhombic crystal tungsten oxide, FIG. 12*c* shows CV curve of mixed hexagonal and cubic crystal tungsten oxides.

At the same time, the applicant also performed two-electrode prototype battery test for the aforementioned three different tungsten oxide negative electrodes, with specific assembly method as follows: hexagonal crystal structure tungsten oxide anode is paired with activated carbon cathode, using a glass fiber membrane as the separator, and filled with 3 mole sulfuric acid electrolyte to assemble tungsten acid single-cell super battery in a PVC bath container. This prototype battery can be subject to charge/discharge test at different current densities in a voltage range of 0 to 1.5 volts. The electrodes can still achieve a capacity of 92 mAh/g at a current density of 1 A/g on negative electrode. FIG. 13 displays a representative charge/discharge curve of this tungsten acid battery (tungsten oxide with hexagonal crystal structure).

Similar to Example 1, another preparation method and performance of super battery made from pure tungsten oxide anode and carbon cathode of a tungsten carbide is given as follows:

Example 2: Super Battery Based on Tungsten Oxide Anode and Carbon Cathode (1) Synthesis of Tungsten Oxide.

Ammonium tungstate is dissolved in deionized water to form 5 wt. % of ammonium tungstate solution, and then 2 molar sulfuric acid solution is added to adjust acid concentration to 1.5 wt. % followed by adding 1 wt. % of ammonium sulfate. The above solution is stirred for 30 minutes to obtain a homogenous mixed solution; the mixed solution is transferred to an autoclave reactor and heated at 90° C. for 12 hours: after the reaction completion it is allowed to cool naturally, then the product is washed with deionized water and dried to obtain hydrous tungsten oxide active material with hexagonal crystal structure.

(2). Fabrication of Tungsten Oxide Electrodes and Carbon Electrodes.

The tungsten oxides prepared in the above Example 2 (1), carbon black conductive agent, PVDF binder in mass ratio of 8:1:1 is dispersed in an appropriate amount of the NMP solvent under stirring and mixing to obtain homogenous tungsten oxide electrode slurry. This electrode slurry is coated onto carbon cloth current collectors, and dried under vacuum at 80° C. for 2 hours to form the tungsten oxide electrodes. Meanwhile, the method of preparing carbon electrodes is as follows: the high surface area activated carbon, carbon black conductive agent, and PVDF binder in mass ratio of 9:0.5:0.5 is dispersed in an appropriate amount of the NMP solvent under stirring and mixing to obtain homogenous carbon electrode slurry. This electrode slurry is coated onto titanium sheet current collectors, and dried under vacuum at 80° C. for 5 hours to form the carbon electrodes.

(3) Fabrication of Tungsten Super Battery.

The tungsten oxides electrode fabricated in the above Example 2 (2) were assembled and tested in three-electrode cells. The used three-electrode system comprises a tungsten electrode, a reference electrode and a counter electrode. The tungsten trioxide was used as negative electrodes in 5 mole/L of sulfuric acid electrolyte, Ag/AgCl electrode as the reference electrode and a platinum sheet as the counter electrode to perform electrode test. When tested at a cyclic voltammetric scan rate of 5 mV/s in a three-electrode cell, the capacity of tungsten oxide electrode showed a capacity of 70 mAh/g; when tested at 50 mV/s, the electrode capacity still maintained at 37 mAh/g. In 4 and 6 mole/L sulfuric acid electrolyte and at a scan rate of 5 mV/s, the electrode material reached a capacity of 43 and 38 mAh/g, respectively. FIG. 14 shows CV curves of electrodes in sulfuric acid electrolytes with different concentrations.

At the same rime, the applicant also performed two-electrode prototype battery test for the aforementioned tungsten oxide negative electrodes, with specific assembly method as follows: 1.7 g of the said tungsten oxide anode is paired with 3.1 g of activated carbon cathode, using a glass fiber membrane as the separator, and filled with 3 mole/L sulfuric acid electrolyte to assemble tungsten acid single-cell super battery in a PVC bath container. This prototype battery can be subject to charge/discharge test at different current densities in a voltage range of 0 to 1.5 volts. The electrodes can achieve a capacity of 73 mAh/g at a current density of 100 mA/g on negative electrode. FIG. 15 displays a representative charge/discharge curve of this tungsten acid battery (tungsten oxide with hexagonal crystal structure).

To further illustrate how the embodiment of the present invention is executed, in the following example the preparation method and performance of the tungsten-carbon super batteries (FIG. 1) based on tungsten oxide-carbon hybrid anode and carbon cathode will be described in detail:

Example 3. Super Battery Based on Tungsten-Carbon Hybrid Anode and Carbon Cathode (1) Fabrication of Tungsten-Carbon Hybrid Anode and Carbon Cathode The used tungsten oxide active material is prepared in the above Example 2. This tungsten oxide, activated carbon, carbon black conductive agent, PVDF binder in mass ratio of 4:4:1:1 is dispersed in an appropriate amount of the NMP solvent under stirring and mixing to obtain homogenous tungsten oxide electrode slurry. It should be noted here that the carbon material used in the above hybrid tungsten oxide electrodes may be any commercially available carbon material for electrode applications, and activated carbon is only a common choice, not a particular preferred example. The one skilled in the art can easily select other common alternative carbon materials to replace the activated carbon in this Example. The same principle can be applied to each of the following examples, and in order to save space, it will no longer be repeated.

This electrode slurry is coated onto tungsten mesh current collectors, and dried under vacuum at 80° C. for 15 hours, followed by pressing at a pressure of 20 t for holding 10 s, and further dried for 15 h (80° C. drying 15 h, 20 tons of pressure holding for 10 s, further drying foil 5 h) to form electrodes.

Meanwhile, the method of preparing carbon electrodes is as follows: the high surface area activated carbon, carbon black conductive agent, and PVDF binder in mass ratio of 9:0.5:0.5 is dispersed in an appropriate amount of the NMP solvent under stirring and mixing to obtain homogenous carbon electrode slurry. This electrode slurry is coated onto tungsten mesh current collectors, and dried under vacuum at 80° C. for 15 hours, followed by pressing at a pressure of 20 t for holding 10 s, and further dried for 15 h to form electrodes.

(2) Fabrication of Tungsten Super Battery.

The aforementioned fabricated hybrid tungsten oxide-carbon anode and carbon cathode were assembled into two-electrode prototype battery for test, with specific assembly method as follows: 2.4 g of the said hybrid tungsten oxide-carbon anode is paired with 4.2 g of activated carbon cathode, using a glass fiber membrane as the separator, and filled with 3 mole/L sulfuric acid electrolyte to assemble tungsten acid single-cell super battery in a PVC bath container. This prototype battery can be subject to charge/discharge test at different current densities in a voltage range of 0 to 1.5 volts. The electrodes can achieve a capacity of 66 mAh/g at a current density of 100 mA/g. FIG. 16 displays a representative charge/discharge curve of this tungsten acid battery.

To further illustrate how the embodiment of the present invention is executed, in the following example the preparation method and performance of the tungsten-carbon super batteries (FIG. 2b) based on tungsten oxide-lead hybrid anode and carbon cathode will be described in detail:

Example 4. Super Battery Based on Tungsten-Lead Hybrid Anode and Carbon Cathode (1) Fabrication of Tungsten-Lead Hybrid Anode and Carbon Cathode The used tungsten oxide active material is prepared in the above Example 2. This tungsten oxide, lead powder, carbon black conductive agent. PVDF binder in mass ratio of 75:20:3:2 is dispersed in an appropriate amount of the NMP solvent under stirring and mixing to obtain homogenous tungsten oxide electrode slurry. This electrode slurry is coated onto tungsten mesh current collectors, and dried under vacuum at 80° C. for 15 hours, followed by pressing at a pressure of 20 t for holding 10 s, and further dried for 15 h to form electrodes. It should be noted here that the lead material used in the above hybrid tungsten oxide electrodes may be any commercially available lead material for electrode applications, and lead powder is only a common choice, not a particular preferred example. The one skilled in the art can easily select other common alternative lead materials to replace the lead powder in this Example. The same principle can be applied to each of the following examples, and in order to save space, it will no longer be repeated.

Meanwhile, the method of preparing carbon electrodes is as follows: the high surface area activated carbon, carbon black conductive agent, and PVDF binder in mass ratio of 9:0.5:0.5 is dispersed in an appropriate amount of the NMP solvent under stirring and mixing to obtain homogenous carbon electrode slurry. This electrode slurry is coated onto tungsten mesh current collectors, and dried under vacuum at 80° C. for 15 hours, followed by pressing at a pressure of 20 t for holding 10 s, and further dried for 15 h to form electrodes.

(2) Fabrication of Tungsten Super Battery.

The fabricated hybrid tungsten oxide-carbon anode and carbon cathode were assembled into two-electrode prototype battery for test, with specific assembly method as follows: the aforementioned hybrid anode containing tungsten and lead was placed in 1.05 mole/L sulfuric acid and used lead oxide as cathode to perform formation. The 1.1 g of the obtained hybrid tungsten oxide-carbon anode from formation is paired with 4.0 g of activated carbon cathode, using a glass fiber membrane as the separator, and filled with 3 mole/L sulfuric acid electrolyte to assemble tungsten acid single-cell super battery in a PVC bath container. This prototype battery can be subject to charge/discharge test at different current densities in a voltage range of 0.2 to 1.5 volts. The battery can achieve a capacity of 32 mAh at a current density of 100 mA/g. FIG. 17 displays a representative charge/discharge curve of this tungsten acid battery, wherein the plateau shows the operating characteristic of the lead active component.

To further illustrate how the embodiment of the present invention is executed, in the following example the preparation method and performance of the tungsten-carbon super batteries (FIG. 2c) based on tungsten oxide and carbon hybrid anode and carbon cathode will be described in detail:

Example 5. Super Battery Based on Tungsten-Carbon Hybrid Anode and Carbon Cathode (1) Fabrication of Tungsten-Carbon Hybrid Anode and Carbon Cathode.

The used tungsten oxide active material is prepared in the above Example 2. This tungsten oxide, carbon black conductive agent, PVDF binder in mass ratio of 97:1:2 are dispersed in an appropriate amount of the NMP solvent under stirring and mixing to obtain homogenous tungsten oxide electrode slurry. This electrode slurry is coated onto tungsten mesh current collector, and dried under vacuum at 80° C. for 15 hours, followed by pressing at a pressure of 20 t for holding 10 s, and further dried for 15 to form tungsten electrode part. The carbon coating layer is then prepared as the following, high surface area activated carbon and PVDF binder in mass ratio of 95:5 is dispersed in an appropriate amount of the NMP solvent under stirring and mixing to obtain homogenous carbon electrode slurry. This electrode slurry is coated onto the foregoing tungsten electrode surface, and dried under vacuum at 60° C. for 24 hours to form the tungsten-carbon hybrid electrode.

Meanwhile, the method of preparing carbon electrodes is as follows: high surface area activated carbon, carbon black conductive agent, and PVDF binder in mass ratio of 9:0.5:0.5 is dispersed in an appropriate amount of the NMP solvent under stirring and mixing to obtain homogenous carbon electrode slurry. This electrode slurry is coated onto tungsten mesh current collectors, and dried under vacuum at 80° C. for 15 hours, followed by pressing at a pressure of 20 t for holding 10 s, and further dried for 15 h to form electrodes.

(2) Fabrication of Tungsten Super Battery.

The fabricated hybrid tungsten oxide-carbon anode and carbon cathode were assembled into two-electrode prototype battery for test, with specific assembly method as follows: the aforementioned hybrid tungsten-carbon anode (which contains 1.7 grams of tungsten oxide and 1.4 grams of active material) is paired with 4.4 g of activated carbon cathode, using a glass fiber membrane as the separator, and filled with 3 mole/L sulfuric acid electrolyte to assemble tungsten acid single-cell super battery in a PVC bath container. This prototype battery can be subject to charge/discharge test at different current densities in a voltage range of 0.2 to 1.5 volts. The battery can achieve a capacity of 120 mAh at a current density of 100 mA/g. FIG. 18 displays a representative charge/discharge curve of this tungsten acid battery.

To further illustrate how the embodiment of the present invention is executed, in the following example the preparation method and performance of the tungsten-carbon super batteries (FIG. 2c) based on tungsten oxide and carbon hybrid anode and carbon cathode will be described in detail:

Example 6. Super Battery Based on Tungsten-Carbon Hybrid Anode and Carbon Cathode (1) Fabrication of Tungsten-Carbon Hybrid Anode and Carbon Cathode.

High surface area activated carbon and PVDF binder in a mass ratio of 95:5 is dispersed in an appropriate amount of the NMP solvent under stirring and mixing to obtain homogenous carbon electrode slurry. This electrode slurry is coated onto tungsten mesh current surface, and dried under vacuum at 80° C. for 15 hours, followed by pressing at a pressure of 20 t for holding 10 s, and further dried for 15 h to form the carbon electrode part. The tungsten-carbon hybrid anode is fabricated based on the foregoing carbon electrode part, by fabrication method as the following: using the tungsten oxide active material prepared in the above Example 2, this tungsten oxide, carbon black conductive agent, PVDF binder in mass ratio of 97:1:2 are dispersed in an appropriate amount of the NMP solvent under stirring and mixing to obtain homogenous tungsten oxide electrode slurry. This electrode slurry is coated onto the foregoing carbon electrode surface, and dried under vacuum at 60° C. for 24 hours to form tungsten-carbon hybrid electrode.

Meanwhile, the method of preparing carbon electrodes is as follows: high surface area activated carbon, carbon black conductive agent, and PVDF binder in mass ratio of 9:0.5:0.5 is dispersed in an appropriate amount of the NMP solvent under stirring and mixing to obtain homogenous carbon electrode slurry. This electrode slurry is coated onto tungsten mesh current collectors, and dried under vacuum at 80° C. for 15 hours, followed by pressing at a pressure of 20 t for holding 10 s, and further dried for 15 h to form electrodes.

(2) Fabrication of Tungsten Super Battery.

The fabricated hybrid tungsten oxide-carbon anode and carbon cathode were assembled into two-electrode prototype battery for test, with specific assembly method as follows: the aforementioned hybrid tungsten-carbon anode (which contains 3.6 grams of tungsten oxide and 1.5 grams of active material) is paired with 4.2 g of activated carbon cathode, using a glass fiber membrane as the separator, and filled with 3 mole/L sulfuric acid electrolyte to assemble tungsten acid single-cell super battery in a PVC bath container. This prototype battery can be subject to charge/discharge rest at different current densities in a voltage range of 0.2 to 1.5 volts. The battery can achieve a capacity of 72 mAh at a current density of 100 mA/g. FIG. 19 displays a representative charge/discharge curve of this tungsten acid battery.

To further illustrate how the embodiment of the present invention is executed, in the following example the preparation method and performance of the tungsten-carbon super batteries (FIG. 2*c*) based on tungsten oxide and lead hybrid anode and carbon cathode will be described in detail:

Example 7. Super Battery Based on Tungsten-Lead Hybrid Anode and Carbon Cathode (1) Fabrication of Tungsten-Lead Hybrid Anode and Carbon Cathode.

The used tungsten oxide active material is prepared in the above Example 2. This tungsten oxide and PVDF binder in a mass ratio of 95:5 are dispersed in an appropriate amount of the NMP solvent under stirring and mixing to obtain homogenous tungsten oxide electrode slurry. This electrode slurry is coated onto the surface of commercial lead-acid battery anode (Tian-Neng lead-acid battery anode, 21 grams per piece) and dried under vacuum at 60° C. for 24 hours to form tungsten-lead hybrid electrode.

Meanwhile, the method of preparing carbon electrodes is as follows: high surface area activated carbon, carbon black conductive agent, and PVDF binder in mass ratio of 9:0.5:0.5 is dispersed in an appropriate amount of the NMP solvent under stirring and mixing to obtain homogenous carbon electrode slurry. This electrode slurry is coated onto tungsten mesh current collectors, and dried under vacuum at 80° C. for 15 hours, followed by pressing at a pressure of 20 t for holding 10 s, and further dried for 15 h to form electrodes.

(2) Fabrication of Tungsten Super Battery.

The fabricated tungsten oxide-lead hybrid anode and carbon cathode were assembled into two-electrode prototype battery for test, with specific assembly method as follows: the aforementioned tungsten-carbon hybrid anode (which contains 5.5 grams of tungsten oxide and 21 grams of commercial lead) is paired with 4.1 g of activated carbon cathode, using a glass fiber membrane as the separator, and filled with 3 mole/L sulfuric acid electrolyte to assemble tungsten acid single-cell super battery in a PVC bath container. This prototype battery can be subject to charge/discharge test at different current densities in a voltage range of 0.2 to 1.5 volts. The battery can achieve a capacity of 390 mAh at a current density of 100 mA/g. FIG. 20 displays a representative charge/discharge curve of this tungsten acid battery.

To further illustrate how the embodiment of the present invention is executed, in the following example the preparation method and performance of the tungsten-based super batteries (FIG. 2*c*) based on tungsten oxide anode and the same tungsten oxide cathode will be described in detail:

Example 8. Super Battery Based on Tungsten Oxide Anode and Tungsten Oxide Cathode (Symmetric Tungsten-Tungsten Battery)

(1) Fabrication of Tungsten Oxide Electrode.

The used tungsten oxide active material is prepared in the above Example 2. This tungsten oxide, carbon black conductive agent and lignin binder in a mass ratio of 87:5:8 are dispersed in an appropriate amount of the aqueous sulfuric acid solution under stirring and mixing to obtain homogenous tungsten oxide electrode slurry. This electrode slurry is coated onto tungsten mesh current collectors, and dried under vacuum at 80° C. for 15 hours, followed by pressing at a pressure of 20 t for holding 10 s, and further dried for 15 h to form electrodes. Such electrode can be used as both cathode and anode of the tungsten super battery.

(2) Fabrication of Tungsten Super Battery Based Tungsten Oxide Cathode.

The fabricated tungsten oxide anode and cathode were assembled into two-electrode prototype battery for test, with specific assembly method as follows: two pieces of identical tungsten-oxide electrodes containing 1.5 grams of tungsten oxide active materials are paired, using a DuPont Nation membrane as the separator, and filled with 3 mole/L sulfuric acid electrolyte to assemble tungsten acid single-cell super battery in a PVC bath container. This prototype battery can be subject to charge/discharge test at different current densities in a voltage range of 0 to 0.6 volts. The battery can achieve a capacity of 15 mAh at a current density of 100 mA/g. FIG. 21 displays a representative charge/discharge curve of this tungsten acid battery.

2. If the Electrochemical Energy Storage and Conversion Device is Tungsten-Based Lead Oxide Super Battery:

The second type of super-batteries of the present invention is depicted in FIG. 3, FIG. 4A, FIG. 4B, FIG. 4C, and FIG. 4D. This type of super-batteries uses lead oxide as the cathode material; uses tungsten-based materials as the anodes, such as pure tungsten materials, mixture of tungsten materials and lead, and mixture of tungsten materials and carbon. This class of super batteries can provide high power density, super long cycling life and considerable energy storage density.

Figure 3:
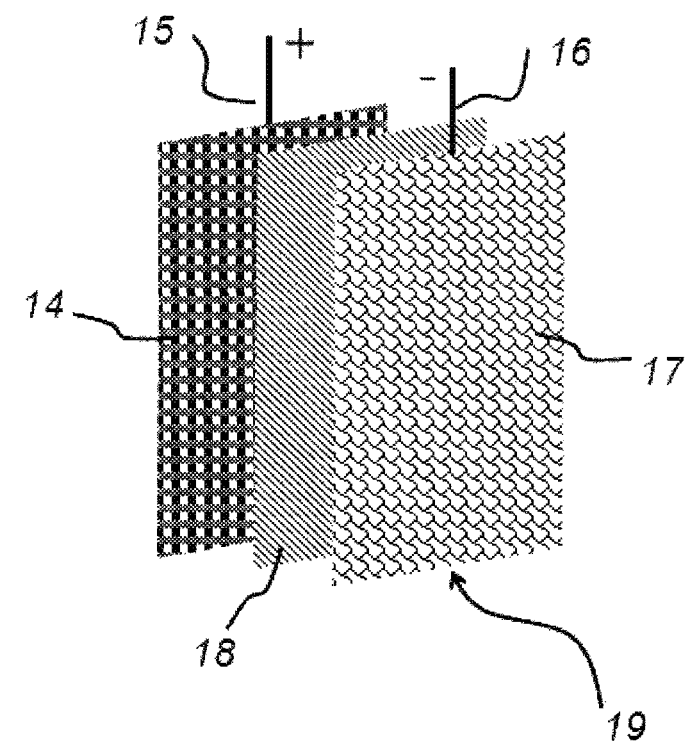

Super battery shown in FIG. 3 includes a tungsten-material-based negative electrode 17, a porous separator 18, lead oxide positive electrode 14, cathode current collector 15, an anode current collector 16, and electrolyte filling in between. Wherein, the separator may be a variety of stable and insulating porous membranes such as glass fiber, non-woven fabric, etc. The membrane plays the role of isolating positive and negative electrodes; the current collectors required for the preparation of electrodes may be various stable and electronic conductive substrates, such as carbon felt, titanium foil, lead grid, etc. They play a role in the collection and conduction electrons. The electrolyte can be various aqueous or organic solutions containing sufficient electrolyte ion concentration and a high ionic conductivity; preferred electrolyte is aqueous electrolyte containing a sufficient concentration of protons, such as sulfuric acid, phosphoric acid, perchloric acid, etc. It plays a role of providing protons. The carbon material for positive electrode may be a variety of porous carbons, which could be selected from activated carbon, carbon nanotubes, carbon nanofibers, graphene or other porous carbon sources. It provides an electric double layer capacitance in the super battery. The used lead oxide electrodes can be fabricated by lead oxide active particles in a similar manner to the existing commercial process, or directly use the existing lead oxide cathode of commercial lead-acid batteries.

Those skilled in the art can readily understand that the tungsten-based active materials may be synthesized by different methods, and the material is then processed into a powder to prepare electrodes. The specific synthetic methods, as an example, will be described in detail below.

In the present invention, the general method of using tungsten-based materials in the tungsten-lead oxide-based super battery is as follows: taking the as-prepared tungsten-based active material in the powder form, conductive agent, a binder and a dispersing agent to formulate into a uniform electrode slurry, and then apply the electrode slurry onto the current collector to form the as-mentioned super battery tungsten-based anode. The specific preparation method, as an example, will be described in detail below.

FIG. 4 also shows a tungsten-based lead oxide super battery. The super battery structure comprises tungsten-based and lead-based anode material, separator, lead oxide cathode and electrolyte.

Figure 4A:
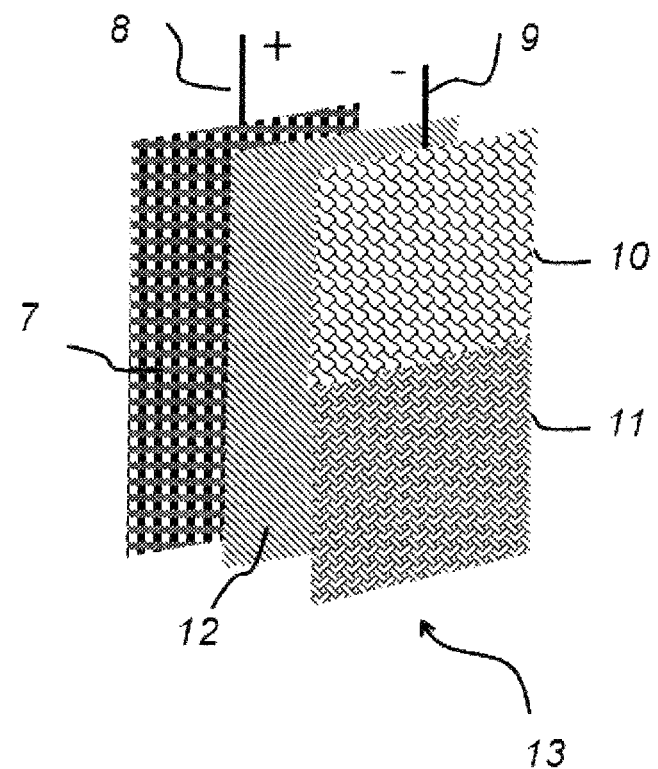

Specifically, FIG. 4A shows the structure composition of the negative electrode in the super battery, wherein the upper and lower portion is tungsten-based active material 23 and lead-based active material 24, respectively, and the proportion of each part of the active material and position can be changed to the needs accordingly.

A possible method of manufacturing the negative electrode is to prepare the tungsten-containing active material or lead in accordance with the aforementioned method to form electrode slurries separately; and then wherein said one electrode slurry is coated on a current collector as the first portion at some position, then said another electrode slurry is coated on the other part of the collector of the other portion of the electrode. Other materials to make the super battery with tungsten-containing and lead-containing hybrid negative electrodes cathode material 20, separator 25, and the electrolyte material are the same as the aforementioned super battery shown in FIG. 3.

Figure 4B:
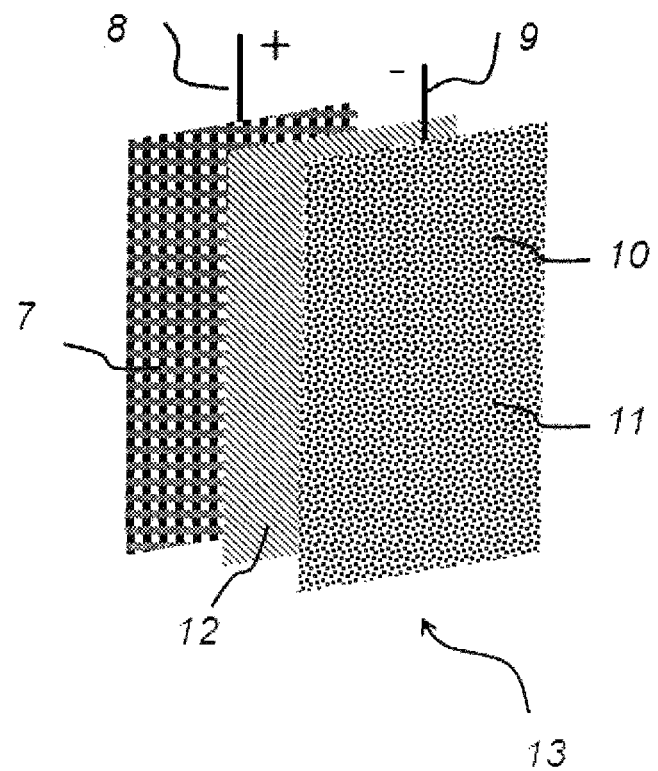

Super battery structure shown in FIG. 4B includes hybrid negative electrode based on tungsten active material 23 and lead active material 24, separator 25, lead oxide cathode 20 and the electrolyte. The active material used in the hybrid tungsten-lead negative electrode can be a mixture of tungsten material and lead material in any proportion or homogenous composite material. Possible manufacturing method for the hybrid negative electrode is to take the tungsten-containing active material and lead material to make uniform slurry according to the aforementioned method; and then coat the electrode slurry with the mixed material to the current collector to form a hybrid electrode structure. Other materials to make the super battery with hybrid tungsten-lead negative electrode including cathode material 20, separator 25 and the electrolyte material are the same as the aforementioned super battery shown in FIG. 3.

Figure 4C:
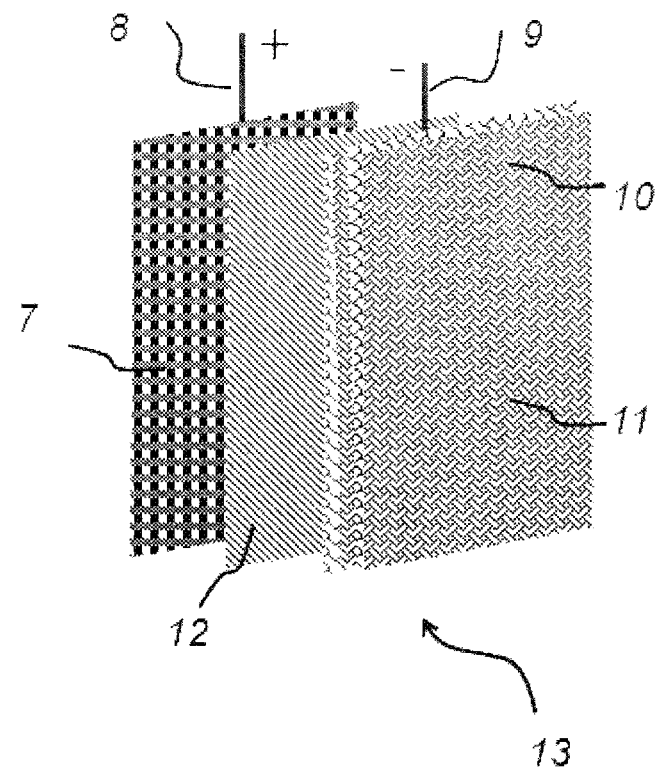

Super battery structure shown in FIG. 4C includes negative electrode that are constructed by alternating tungsten-based active material layers 23 and lead-based active material layers 24, separator 25, lead oxide cathode 20 and the electrolyte filled in. As shown in FIG. 4O, the wherein said super battery anode can be constructed by alternatively coating tungsten-based active layers and lead-based active layers, or by alternatively coating tungsten-based active layers and carbon-based active layers, or by alternatively coating lead-based active layers and carbon-based active layers, or by alternatively coating tungsten-based active layers, lead-based active layers and carbon-based active layers. The thickness, number of layers and coating sequence of each active layer can be adjusted as needed without limitation. Possible method for manufacturing the hybrid negative electrode is to take the tungsten-containing material or lead material or high surface area carbon as active materials to form an electrode slurry in accordance with the aforementioned method; then the above electrode slurry of hybrid material is layer-by-layer coated on the current collector to form layered hybrid electrodes according to the foregoing designed sequence, thickness and number of layers. Other materials to make the super battery with hybrid tungsten-lead negative electrode including cathode material 20, separator 25 and the electrolyte material are the same as the aforementioned super battery shown in FIG. 3.

Figure 4D:
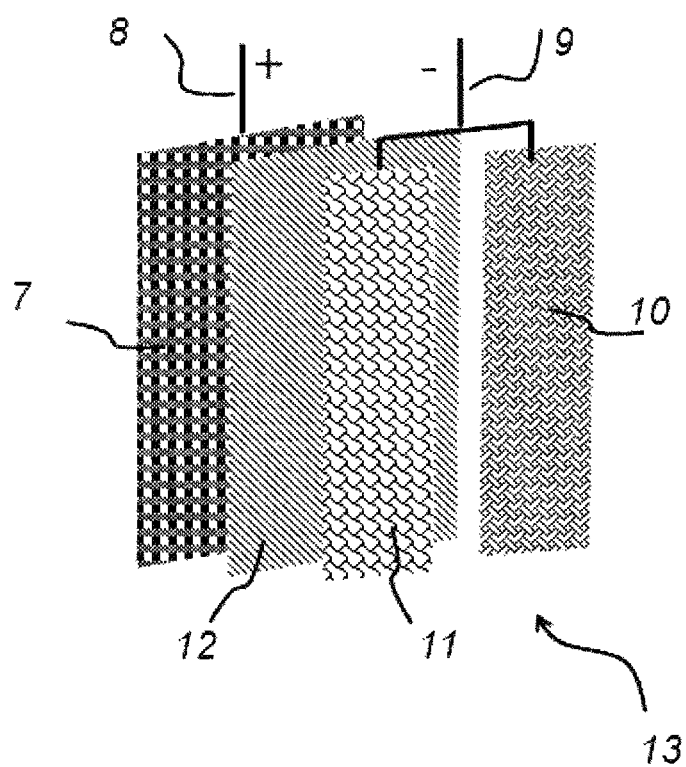

Super battery structure shown in FIG. 4D includes tungsten-based anode and lead-based anode connected in parallel, separator, lead oxide cathode and electrolyte filled in. As shown in FIG. 4D, the negative electrode of the super battery consists of two separately formed electrodes that are connected in parallel; wherein one electrode is made of tungsten-containing material, the other electrode is made from lead material. Location and size of the two electrodes can be adjusted without limitation depending on design requirements. Possible manufacturing method for the hybrid negative electrode is to take the tungsten-containing active material and lead-containing materials to make electrode slurry separately according to the aforementioned method; then the above electrode slurries are separately coated on a current collector to form each individual electrode. The as-formed tungsten electrode and the lead electrode are then connected together to constitute a negative electrode of a super battery. Other materials to make the super battery with hybrid tungsten-lead negative electrode including cathode material 20, separator 25 and the electrolyte material are the same as the aforementioned super battery shown in FIG. 3.

To further illustrate how the embodiment of the present invention is executed, in the following example the preparation method and performance of the tungsten-based lead oxide super batteries (FIG. 3) based on tungsten oxide anode and lead oxide cathode will be described in detail:

First, the synthesis and specific characterization of tungsten oxide as follows:

Example 9. Tungsten-Based Lead Oxide Super Battery Based on Tungsten Oxide Anode and Lead Oxide Cathode (1) Preparation of Tungsten Oxide.

Sodium tungstate is dissolved in deionized water to form 2 wt. % of sodium tungstate solution, and then 3 molar/L sulfuric acid solution is added to adjust acid concentration to 1.5 wt. %, and followed by adding 2 wt. % of ammonium sulfate. The above solution is stirred for 30 minutes to obtain a homogenous mixed solution; the mixed solution is transferred to an autoclave reactor and heated at 95° C. for 12 hours; after the reaction completion it is allowed to cool naturally, then the product is washed with deionized water and dried to obtain hydrous hexagonal tungsten oxide active material for electrode use.

(2) Fabrication of Tungsten Oxide Electrode.

The used tungsten oxide active material is prepared according to the above method (Example 9(1)), This tungsten oxide, carbon black conductive agent and PVDF binder in a mass ratio of 97:1:2 are dispersed in an appropriate amount of NMP solvent under stirring and mixing to obtain homogenous tungsten oxide electrode slurry. This electrode slurry is coated onto tungsten grid current collectors, and dried under vacuum at 80° C. for 15 hours, followed by pressing at a pressure of 20 t for holding 10 s, and further dried for 15 h to form electrodes.

(3) Fabrication of Tungsten Super Battery.

The fabricated tungsten oxide-lead hybrid anode is assembled into two-electrode prototype battery for test, with specific assembly method as follows: the lead oxide cathode is Tian-Neng lead-acid battery cathode with mass of 31 grams per piece; the aforementioned hybrid tungsten-anode (1 gram) is paired with such lead oxide cathode, using a glass fiber membrane as the separator, and filled with 6 mole/L sulfuric acid electrolyte to assemble tungsten acid single-cell super battery in a PVC bath container. This prototype battery can be subject to charge/discharge test at different current densities in a voltage range of 1.5 to 2.2 volts. The battery can achieve a capacity of 49 mAh at a current density of 0.25 A. FIG. 22 displays a stability charge/discharge curve of this tungsten acid battery.

To further illustrate how the embodiment of the present invention is executed, in the following example the preparation method and performance of the tungsten-based lead oxide super batteries (FIG. 3) based on tungsten oxide anode and lead oxide cathode will be described in detail:

Example 10. Tungsten-Based Lead Oxide Super Battery Based on Tungsten Oxide Anode and Lead Oxide Cathode (1) Fabrication of Tungsten Oxide Electrode.

The tungsten oxide active material prepared in Example 9, carbon black conductive agent and lignin binder in a mass ratio of 87:5:8 are dispersed in an appropriate amount of aqueous sulfuric acid solution under stirring and mixing to obtain homogenous tungsten oxide electrode slurry. This electrode slurry is coated onto lead grid current collectors, and dried at 70° C. for 15 hours to form tungsten oxide electrodes.

(2) Fabrication of Tungsten Super Battery.

The fabricated tungsten oxide-lead hybrid anode is assembled into two-electrode prototype battery for test, with specific assembly method as follows: the lead oxide cathode is a Tian-Neng lead-acid battery cathode, with mass of 31 grams; the aforementioned hybrid tungsten-anode (3.8 gram) is paired with such lead oxide cathode, using a glass fiber membrane as the separator, and filled with 6 mole/L sulfuric acid electrolyte to assemble tungsten acid single-cell super battery in a PVC bath container. This prototype battery can be subject to charge/discharge test at different current densities in a voltage range of 1.3 to 2.15 volts. The battery can achieve a capacity of 198 mAh at a current density of 0.015 A. FIG. 23 displays a stability charge/discharge curve of this tungsten acid battery.

To further illustrate how the embodiment of the present invention is executed, in the following example the preparation method and performance of the tungsten-based lead oxide super batteries (FIG. 4b) based on tungsten oxide-lead hybrid anode and lead oxide cathode will be described in detail:

Example 11. Tungsten-Based Lead Oxide Super Battery Based on Tungsten Oxide-Lead Hybrid Anode and Lead Oxide Cathode (1) Fabrication of Tungsten Oxide-Lead Hybrid Electrode.

The hydrous tungsten oxide active material is prepared in Example 9. Lead powder, the foregoing tungsten oxide, carbon black conductive agent and lignin binder in a mass ratio of 88:5:5:2 are dispersed in an appropriate amount of the aqueous sulfuric acid solution under stirring and mixing to obtain homogenous tungsten oxide-lead hybrid electrode slurry, followed by adding 1 wt. % of calcium nitrate and mixing. This electrode slurry is coated onto lead grid current collectors, cured at 40° C. for 48 hours at a relatively humidity of 98%, and dried at 60° C. for 12 hours to form hybrid tungsten-lead electrodes. It should be noted that, herein the calcium nitrate is a hydrogen evolution inhibitor. Specifically, it can hinder the discharge of protons on the carbon negative electrode, and can be one or more or mixture from metal salt, metal ion complexes, organic materials that can increase overpotential of hydrogen evolution reaction on battery carbon anode. In addition to this example, the hydrogen evolution inhibitors used in other Examples are indium oxide, barium nitrate, etc., which are all the common choices of the art. It will no longer be described repeatedly in the following context.

(2) Fabrication of Tungsten Super Battery.

The fabricated tungsten oxide-lead hybrid anode is assembled into two-electrode prototype battery for test, with specific assembly method as follows: the lead oxide cathode is a Tian-Neng lead-acid battery cathode, with mass of 31 grams; the aforementioned hybrid tungsten-anode (28 gram) is paired with such lead oxide cathode, using a glass fiber membrane as the separator, and filled with 6 mole/L sulfuric acid electrolyte to assemble tungsten acid single-cell super battery in a PVC bath container. This prototype battery can be subject to charge/discharge test at different current densities in a voltage range of 1.7 to 2.4 volts. The battery can achieve a capacity of 910 mAh at a current density of 0.35 A. FIG. 24 displays a stability charge/discharge curve of this tungsten acid battery.

To further illustrate how the embodiment of the present invention is executed, in the following example the preparation method and performance of the tungsten-based lead oxide super batteries (FIG. 4b) based on tungsten oxide-lead hybrid anode and lead oxide cathode will be described in detail:

Example 12. Tungsten Super Battery Based on Tungsten Oxide-Lead Hybrid Anode and Lead Oxide Cathode (1) Fabrication of Tungsten Oxide-Lead Hybrid Electrode.

The hydrous tungsten oxide active material is prepared in Example 9. Lead powder, the foregoing tungsten oxide, carbon black conductive agent and lignin binder in a mass ratio of 88:5:5:2 are dispersed in an appropriate amount of the aqueous sulfuric acid solution under stirring and mixing to obtain homogenous tungsten oxide-lead hybrid electrode slurry, followed by adding 3 wt. % of indium oxide ($In_2O_3$) and mixing. This electrode slurry is coated onto lead grid current collectors, cured at 40° C. for 48 hours at a relatively humidity of 98%, and dried at 60° C. for 12 hours to form hybrid tungsten-lead electrodes.

(2) Fabrication of Tungsten Super Battery.

The fabricated tungsten oxide-lead hybrid anode is assembled into two-electrode prototype battery for test, with specific assembly method as follows: the lead oxide cathode is a Tian-Neng lead-acid battery cathode, with mass of 31 grams; the aforementioned hybrid tungsten-anode (28 gram) is paired with such lead oxide cathode, using a glass fiber membrane as the separator, and filled with 6 mole/L sulfuric acid electrolyte to assemble tungsten acid single-cell super battery in a PVC bath container. This prototype battery can be subject to charge/discharge test at different current densities in a voltage range of 1.7 to 2.4 volts. The battery can achieve a capacity of 850 mAh at a current density of 0.35 A. FIG. 25 displays a stability charge/discharge curve of this tungsten acid battery.

To further illustrate how the embodiment of the present invention is executed, in the following example the preparation method and performance of the tungsten-based lead oxide super batteries (FIG. 4b) based on tungsten oxide-lead hybrid anode and lead oxide cathode will be described in detail:

Example 13. Tungsten Super Battery Based on Tungsten Oxide-Lead Hybrid Anode and Lead Oxide Cathode (1) Fabrication of Tungsten Oxide-Lead Hybrid Electrode.

The hydrous tungsten oxide active material is prepared in Example 9. The foregoing tungsten oxide, lead powder, carbon black conductive agent and lignin binder in a mass ratio of 75:20:3:2 are dispersed in an appropriate amount of the aqueous sulfuric acid solution under stirring and mixing to obtain homogenous tungsten oxide-lead hybrid electrode slurry, followed by adding 3 wt. % of barium nitrate and mixing. This electrode slurry is coated onto lead grid current collectors, cured at 40° C. for 48 hours at a relatively humility of 98%, and dried at 60° C. for 12 hours to form hybrid tungsten-lead electrodes.

(2) Fabrication of Tungsten Super Battery.

The fabricated tungsten oxide-lead hybrid anode is assembled into two-electrode prototype battery for test, with specific assembly method as follows: the lead oxide cathode is a Tian-Neng lead-acid battery cathode, with mass of 31 grams; the aforementioned hybrid tungsten-anode (7 gram) is paired with such lead oxide cathode, using a glass fiber membrane as the separator, and filled with 6 mole/L sulfuric acid electrolyte to assemble tungsten acid single-cell super battery in a PVC bath container. This prototype battery can be subject to charge/discharge test at different current densities in a voltage range of 1.7 to 2.4 volts. The battery can achieve a capacity of 490 mAh at a current density of 0.13 A. FIG. 26 displays a stability charge/discharge curve of this tungsten acid battery.

To further illustrate how the embodiment of the present invention is executed, in the following example the preparation method and performance of the tungsten-based lead oxide super batteries (FIG. 4c) based on tungsten oxide-lead hybrid anode and lead oxide cathode will be described in detail:

Example 14. Tungsten Super Battery Based on Tungsten Oxide-Lead Hybrid Anode and Lead Oxide Cathode (1) Fabrication of Tungsten Oxide-Lead Hybrid Electrode.

The hydrous tungsten oxide active material is prepared in Example 9. The Tian-Neng lead-acid battery lead anode, with a mass of 28 grams, is used as the substrate. The foregoing tungsten oxide and PVDF binder in a mass ratio of 95:5 are dispersed in an appropriate amount of NMP solvent under stirring and mixing to obtain homogenous tungsten oxide-lead hybrid electrode slurry, followed by adding 1 wt. % of barium nitrate and mixing. This electrode slurry is coated onto Tian-Neng lead-acid battery lead anode, and dried under vacuum at 60° C. for 24 hours to form hybrid tungsten-lead electrodes.

(2) Fabrication of Tungsten Super Battery.

The fabricated tungsten oxide-lead hybrid anode is assembled into two-electrode prototype battery for test, with specific assembly method as follows: the lead oxide cathode is a Tian-Neng lead-acid battery cathode, with mass of 31 grams; the aforementioned hybrid tungsten-anode is paired with such lead oxide cathode, using a glass fiber membrane as the separator, and filled with 6 mole/L sulfuric acid electrolyte to assemble tungsten acid single-cell super battery in a PVC bath container. This prototype battery can be subject to charge/discharge test at different current densities in a voltage range of 1.7 to 2.4 volts. The anode contains 28 grams of lead and 8 grams of active tungsten oxide. The battery can achieve a capacity of 1260 mAh at a current density of 0.566 A. FIG. 27 displays a stability charge/discharge curve of this tungsten acid battery.

To further illustrate how the embodiment of the present invention is executed, in the following example the preparation method and performance of the tungsten-based lead oxide super batteries (FIG. 4a) based on tungsten oxide-lead hybrid anode and lead oxide cathode will be described in detail:

Example 15. Tungsten Super Battery Based on Tungsten Oxide-Lead Hybrid Anode and Lead Oxide Cathode (1) Fabrication of Tungsten Oxide-Lead Hybrid Electrode.

The Tian-Neng lead-acid battery lead anode, after removing half of lead active materials, is used as the substrate, which has 10.1 grams of remaining electrode active materials. The hydrous tungsten oxide active material is prepared in Example 9. This tungsten oxide, carbon black and PVDF binder in a mass ratio of 95:3:2 are dispersed in an appropriate amount of NMP solvent under stirring and mixing to obtain homogenous tungsten oxide-lead hybrid electrode slurry, followed by adding 3 wt. % of barium nitrate and mixing. This electrode slurry is coated onto remaining part of Tian-Neng lead-acid battery lead anode, and dried under vacuum at 80° C. for 15 hours, followed by pressing at a pressure of 20 t for holding 10 s, and further dried for 15 h to form hybrid tungsten-lead electrodes.

(2) Fabrication of Tungsten Super Battery.

The fabricated tungsten oxide-lead hybrid anode is assembled into two-electrode prototype battery for test, with specific assembly method as follows: the lead oxide cathode is a Tian-Neng lead-acid battery cathode, with mass of 31 grams. The aforementioned hybrid tungsten-anode is paired with the lead oxide cathode, using a glass fiber membrane as the separator, and filled with 6 mole/L sulfuric acid electrolyte to assemble tungsten acid single-cell super battery in a PVC bath container. This prototype battery can be subject to charge/discharge test at different current densities in a voltage range of 1.7 to 2.4 volts. The anode contains 10.1 grams of lead and 4.1 grams of active tungsten oxide. The battery can achieve a capacity of 990 mAh at a current density of 0.315 A. FIG. 28 displays a stability charge/discharge curve of this tungsten acid battery.

3. Tungsten-Carbon/Tungsten-Lead Oxide Hybrid Super Battery Systems.

The third category of super-batteries integrated the first class and second class of super batteries to form a new type of hybrid battery systems. Compared with the previous two types of super batteries, these super batteries can provide optimized performance: high power, high energy density and long cycle life.

Figure 5:
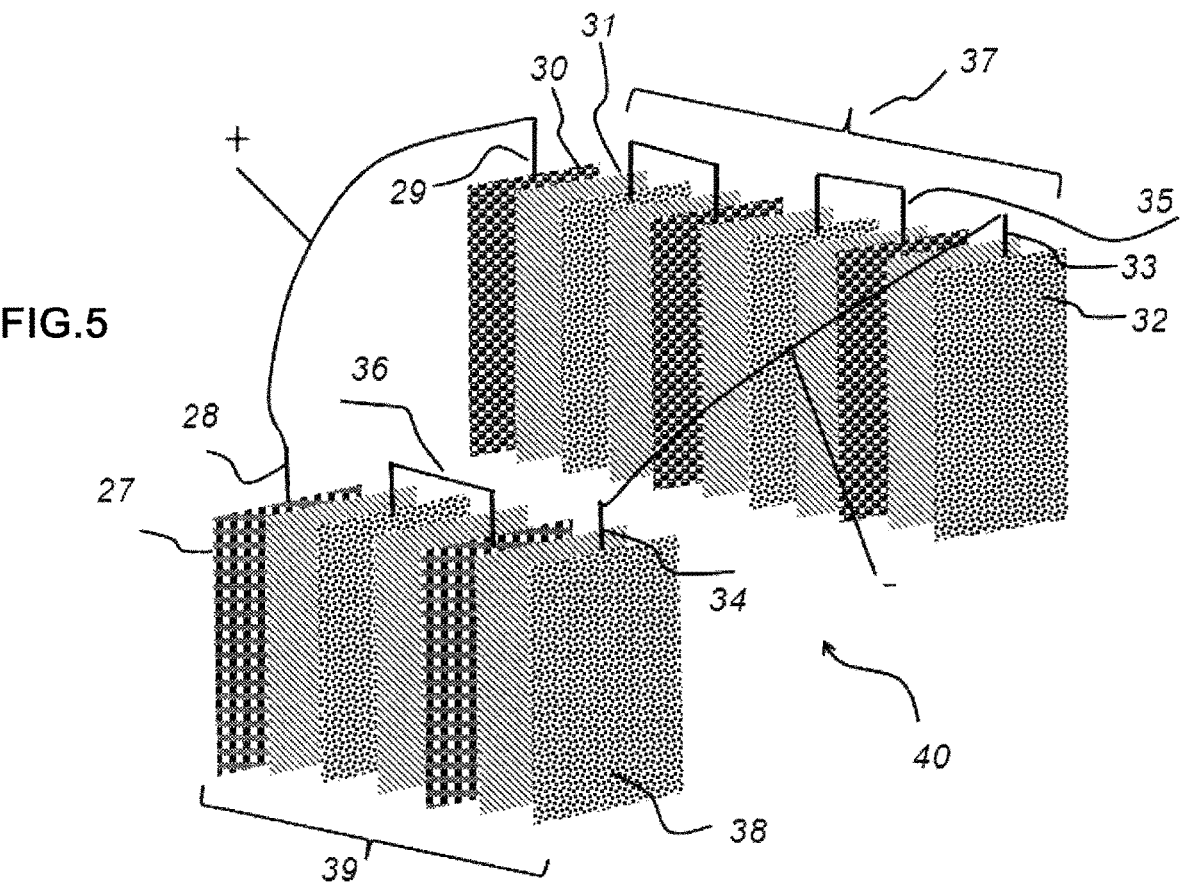

The third category of super batteries in the present invention is depicted in FIG. 5, which contains a group of the first class of super batteries based on carbon-material-based cathode (for example, a variety of super batteries shown in FIG. 1 or FIGS. 2A-D) and another group of second class of super batteries based on lead oxide positive electrode (for example, a variety of battery shown in FIG. 3 or FIG. 4A-D). The each cell inside the wherein said third category of super is connected in a series manner, wherein each unit cell can be manufactured by the aforementioned method. For the second group of super battery based on the positive lead oxide, in addition to use the aforementioned super batteries show in FIG. 3, FIG. 4A, FIG. 4B, and FIG. 4C, and FIG. 4D, the commercial lead-acid batteries (based on lead oxide cathode and lead anode), nickel metal-hydride batteries, nickel-cadmium batteries, lithium-ion batteries, lithium-sulfur batteries, zinc air batteries or lithium-air batteries can also be used. The two sets of super battery internally connected in series manner are externally coupled in parallel manner to form the third category of super battery described in FIG. 5. Wherein, the super battery voltage can be balanced by adjusting the number of single cells used in each group. For example, unit cell voltage of the aforementioned super battery shown in FIG. 1 is 1.55 volts; commercial lead-acid battery has a cell voltage of 2.3 volts; in this case, three cells of the first group connected in series can achieve the same voltage as two cells of the second group connected in series; super batteries formed by connected these two groups of cells in parallel can achieve the said third category of the super battery with a voltage of 4.6 volts. Similarly, the third category of super battery with different voltages can be achieved by changing the number of each unit cell.

To further illustrate how the embodiment of the present invention is executed, in the following example the preparation method and performance of the tungsten-carbon/tungsten-lead oxide hybrid super batteries (FIG. 5) will be described in detail:

Example 16. Hybrid Tungsten Super Battery (1) Preparation of Tungsten Oxide.

Ammonium tungstate is dissolved in deionized water to form 5 wt. % of ammonium tungstate solution, and then 3 molar/L sulfuric acid solution is added to adjust acid concentration to 1.5 wt. %, and followed by adding 1 wt. % of ammonium sulfate. The above solution is stirred for 30 minutes to obtain a homogenous mixed solution; the mixed solution is transferred to an autoclave reactor and heated at 90° C. for 12 hours; after the reaction completion it is allowed to cool naturally, then the product is washed with deionized water and dried to obtain hydrous hexagonal tungsten oxide active material for electrode use.

(2) Fabrication of Tungsten Oxide Electrode.

The used tungsten oxide active material prepared according to the above method (Example 16(1)), carbon black conductive agent and PVDF binder in a mass ratio of 97:1:2 are dispersed in an appropriate amount of NMP solvent under stirring and mixing to obtain homogenous tungsten oxide electrode slurry. This electrode slurry is coated onto tungsten mesh current collectors, and dried under vacuum at 80° C. for 2 hours to form electrodes with mass of 1.5 grams per piece.

(3) Fabrication of Tungsten Super Battery.

The fabricated tungsten oxide-lead hybrid anode is assembled into two-electrode prototype battery for test, with specific assembly method as follows: the lead oxide cathode is Tian-Neng lead-acid battery cathode with mass of 31 grams per piece; the aforementioned hybrid tungsten-anode is paired with such lead oxide cathode, using 10 pieces of anodes and 6 pieces of cathode connected in parallel, using a glass fiber membrane as the separator, and filled with 6 mole/L sulfuric acid electrolyte to assemble tungsten acid single-cell super battery in a PVC bath container. This prototype battery can be subject to charge/discharge test at different current densities in a voltage range of 1.3 to 2.25 volts. The hybrid super battery anode contains 15 grams of tungsten oxide active materials, and can achieve a capacity of 780 mAh at a current density of 1 A. FIG. 29 displays a stability charge/discharge curve of this tungsten acid battery.

Example 17. Hybrid Tungsten Super Battery (1) Fabrication of Tungsten Oxide Electrode.

The used tungsten oxide active material is prepared according to the above method Example 16. This tungsten oxide, carbon black conductive agent and PVDF binder in a mass ratio of 93:5:2 are dispersed in an appropriate amount of NMP solvent under stirring and mixing to obtain homogenous tungsten oxide electrode slurry. This electrode slurry is coated onto lead grid current collectors, and dried at 80° C. for 15 hours, followed by pressing at a pressure of 20 t for holding 10 s, and further dried for 15 h to form single electrode with mass of 5.7 grams.

(2) Fabrication of Tungsten Super Battery.

The fabricated tungsten oxide-lead hybrid anode is assembled into two-electrode prototype battery for test, with specific assembly method as follows: the lead oxide cathode is Tian-Neng lead-acid battery cathode with mass of 31 grams per piece; the aforementioned hybrid tungsten-anode is paired with such lead oxide cathode, using 3 pieces of anodes and 4 pieces of cathode connected in parallel, using a glass fiber membrane as the separator, and filled with 6 mole/L sulfuric acid electrolyte to assemble tungsten acid single-cell super battery in a PVC bath container. This prototype battery can be subject to charge/discharge test at different current densities in a voltage range of 1.3 to 2.25 volts. The hybrid super battery anode contains 17 grams of tungsten oxide active materials, and can achieve a capacity of 1090 mAh at a current density of 1 A. FIG. 30 displays a stability charge/discharge curve of this tungsten acid battery.

Example 18. Hybrid Tungsten Super Battery (1) Fabrication of Tungsten Oxide Electrode.

The used tungsten oxide active material is prepared according to the above method Example 16. This tungsten oxide, carbon black conductive agent and PVDF binder in a mass ratio of 93:5:2 are dispersed in an appropriate amount of NMP solvent under stirring and mixing to obtain homogenous tungsten oxide electrode slurry. This electrode slurry is coated onto lead grid current collectors, and dried at 80° C. for 15 hours, followed by pressing at a pressure of 20 t for holding 10 s, and further dried for 15 h to form single electrode with mass of 1.5 grams.

(2) Fabrication of Tungsten Super Battery.

The fabricated tungsten oxide-lead hybrid anode is assembled into two-electrode prototype battery for test, with specific assembly method as follows: the lead oxide cathode is Tian-Neng lead-acid battery cathode with mass of 31 grams per piece. First, one piece of the aforementioned hybrid tungsten-anode is paired with a Tian-Neng lead oxide cathode, using glass fiber to separate, and four of such unit cells are connected in series to form the tungsten battery part; three Tian-Neng lead acid batteries are connected in series to form the lead-acid battery part; the tungsten battery part and lead-acid battery part are then externally connected in parallel, and filled with 6 mole/L sulfuric acid electrolyte to assemble hybrid tungsten acid super battery in a PVC bath container. This prototype battery can be subject to charge/discharge test at different current densities in a voltage range of 5.5 to 7.5 volts. The battery is discharged to 50% state-of-charge at a small current of 825 mA, and then subjected to high-rate partial state of charge (HRPSoC) operation conditions. The super battery is charged at a current of 1390 mA for 60 seconds, and after holding for 10 seconds it is charged at a current of 1390 mA for 60 seconds; the cut-off voltage of charge/discharge cycle is 8.49 volts and 5.10, respectively. In this process, the voltage changes slowly and the electrode resistance is stable. FIG. 31a shows the cycling curve of the hybrid tungsten acid battery; FIG. 31b shows the charge/discharge curves after 15530 times.

Example 19. Hybrid Tungsten Super Battery (1) Fabrication of Tungsten Oxide Electrode.

The used tungsten oxide active material is prepared according to the above method Example 16. This tungsten oxide, carbon black conductive agent and PVDF binder in a mass ratio of 93:5:2 are dispersed in an appropriate amount of NMP solvent under stirring and mixing to obtain homogenous tungsten oxide electrode slurry. This electrode slurry is coated onto blank lead grid current collectors, and dried at 80° C. for 15 hours, followed by pressing at a pressure of 20 t for holding 10 s, and further dried for 15 h to form single electrode with mass of 4 grams.

(2) Fabrication of Tungsten Super Battery.

The fabricated tungsten oxide-lead hybrid anode is assembled into two-electrode prototype battery for test, with specific assembly method as follows: the lead oxide cathode is Tian-Neng lead-acid battery cathode with mass of 31 grams per piece. First, one piece of the aforementioned hybrid tungsten-anode is paired with a Tian-Neng lead oxide cathode, using glass fiber to separate, and three of such unit cells are connected in series to form the tungsten battery part; three Tian-Neng lead acid batteries are connected in series to form the lead-acid battery part; the tungsten battery part and lead-acid battery part are then externally connected in parallel, and filled with 6 mole/L sulfuric acid electrolyte to assemble hybrid tungsten acid super battery in a PVC bath container. This prototype battery can be subject to charge/discharge test at different current densities in a voltage range of 5 to 7 volts.

The battery is discharged to 50% state-of-charge at a small current of 825 mA, and then subjected to HRPSoC operation conditions. The super battery is charged at a current of 1390 mA for 60 seconds, and after holding for 10 seconds it is charged at a current of 1390 mA for 60 seconds: the cut-off voltage of charge/discharge cycle is 8.49 volts and 5.10, respectively. In this process, the voltage changes slowly and the electrode resistance is stable. FIG. 32a shows the cycling curve of the hybrid tungsten acid battery; FIG. 32b shows the charge/discharge curves after 10770 times.

Example 20. Hybrid Tungsten Super Battery (1) Fabrication of Tungsten Oxide Electrode.

The used tungsten oxide active material is prepared according to the above method Example 16. This tungsten oxide, carbon black conductive agent and PVDF binder in a mass ratio of 93:5:2 are dispersed in an appropriate amount of NMP solvent under stirring and mixing to obtain homogenous tungsten oxide electrode slurry, followed by adding 3 wt. % of barium nitrate and mixing. This electrode slurry is coated onto an anode of Tian-Neng lead-acid batteries, and dried at 60° C. for 24 hours form single electrode with tungsten active materials mass of 8.5 grams.

(2) Fabrication of Tungsten Super Battery.

The fabricated tungsten oxide-lead hybrid electrode (anode) is assembled into two-electrode prototype battery for test, with specific assembly method as follows: the lead oxide cathode is Tian-Neng lead-acid battery cathode with mass of 31 grams per piece. First, one piece of the aforementioned hybrid tungsten-anode is paired with a lead oxide cathode, using glass fiber to separate, and three of such unit cells are connected in series to form the tungsten battery part; three Tian-Neng lead acid batteries are connected in series to form the lead-acid battery part; the tungsten battery part and lead-acid battery part are then externally connected in parallel, and filled with 6 mole/L sulfuric acid electrolyte to assemble hybrid tungsten acid super battery in a PVC bath container. This prototype battery can be subject to charge/discharge test at different current densities in a voltage range of 5.5 to 7.5 volts. The battery is discharged to 50% state-of-charge at a small current of 825 mA, and then subjected to HRPSoC operation conditions. The super battery is charged at a current of 1390 mA for 60 seconds, and after holding for 10 seconds it is charged at a current of 1390 mA for 60 seconds; the cut-off voltage of charge/discharge cycle is 8.49 volts and 5.10, respectively. In this process, the voltage changes slowly and the electrode resistance is stable. FIG. 33a shows the cycling curve of the hybrid tungsten acid battery; FIG. 33b shows the charge/discharge curves after 5067 times.

It should be noted that, the embodiment of the present invention can be easily achieved, and is not subject to any form of restriction to the present invention. Anyone who is familiar with the field may change or modify the technical content revealed above to realize effective equivalent embodiments. But those related to the present invention, or any revision, or equivalent change, or modification based on the technical content of the present invention are considered to be within the scope of this invention.

What is claimed is:

1. An electrochemical energy storage and conversion device that comprises:

an aqueous electrolyte solution; and at least one of:
- a tungsten carbon super battery having one electrode made of a tungsten material and another electrode made of carbon;
- a tungsten and tungsten super battery having one electrode and another electrode that are each made of a tungsten trioxide material;
- a tungsten lead oxide super battery having one electrode made of the tungsten trioxide material and another electrode made of lead oxide; and
- a hybrid super battery that is constructed by the tungsten carbon super battery and the tungsten lead oxide super battery connected in parallel or in series, wherein the tungsten material and the tungsten trioxide material are each at least one selected from the group consisting of:

(a) a hydrous tungsten trioxide ($WO_3 \cdot nH2O$) having a crystal structure selected from the group consisting of a cubic crystal structure, a hexagonal structure, a bi-continuous structure, and combinations thereof, and wherein n is a value in the range of $0 < n \leq 5$;

(b) the hydrous tungsten trioxide of section (a), which is doped with an element A ($A_xWO_3 \cdot nH_2O$), wherein the element A is at least one element selected from the group consisting of an alkali metal that is either sodium or potassium, an alkaline earth metal that is either calcium or strontium, a transition metal that is either titanium or zirconium, and a rare metal that is either lanthanum or cerium, and x is a value in the range of $0 < x \leq 0.3$; and (c) a mixture or composite material that consists of a tungsten-free material and at least one of the hydrous tungsten trioxide of section (a) and the hydrous tungsten trioxide of section that is doped with the element A of section (b), wherein the tungsten-free material is selected from the group consisting of:
- a carbon material that is selected from the group consisting of carbon black, onion structured carbon particles, activated carbon, mesoporous carbon, carbon nanotubes, carbon nanofiber, graphite, graphene, graphene oxide, combinations thereof,
- a polymer material that is selected from the group consisting of polyaniline, polypyrrole, polythiophene, poly (3,4-ethylenedioxythiophene), polystyrene, sulfonated polystyrene, and combinations thereof,
- a metal or salt thereof that is selected from the group consisting of vanadium, chromium, zirconium, niobium, molybdenum, lead, bismuth, and combinations thereof, and
- a ceramic material that is selected from the group consisting of zirconium oxide, silicon oxide, strontium oxide, aluminum oxide, and combinations thereof.

2. The electrochemical energy storage and conversion device according to claim 1, wherein the tungsten trioxide material is a powdered material having a particle size of about 50 μm or less.

3. The electrochemical energy storage and conversion device according to claim 1, further comprising at least one current collector, wherein the current collector is formed from a material that is selected from the group consisting of chromium, titanium, tungsten, molybdenum, silver, ruthenium, palladium, platinum, iridium, gold, and alloys thereof; a carbon material, a conductive polymer material, and a combination thereof; and a lead alloy grid used in a commercial lead-acid battery.

* * * * *